US012536696B2

United States Patent
Paden et al.

(10) Patent No.: US 12,536,696 B2
(45) Date of Patent: Jan. 27, 2026

(54) ASSOCIATION OF CONCURRENT TRACKS ACROSS MULTIPLE VIEWS

(71) Applicant: Summer Robotics, Inc., Campbell, CA (US)

(72) Inventors: Brian Alexander Paden, Scotts Valley, CA (US); Steven Dean Gottke, Hayward, CA (US)

(73) Assignee: Summer Robotics, Inc., Campbell, CA (US)

( * ) Notice: Subject to any disclaimer, the term of this patent is extended or adjusted under 35 U.S.C. 154(b) by 738 days.

(21) Appl. No.: 17/991,610

(22) Filed: Nov. 21, 2022

(65) Prior Publication Data

US 2023/0169683 A1    Jun. 1, 2023

Related U.S. Application Data

(60) Provisional application No. 63/266,310, filed on Dec. 31, 2021, provisional application No. 63/264,609, filed on Nov. 28, 2021.

(51) Int. Cl.
*G06T 7/73*    (2017.01)
*G01S 17/89*    (2020.01)

(52) U.S. Cl.
CPC ............. *G06T 7/74* (2017.01); *G01S 17/89* (2013.01); *G06T 2207/30241* (2013.01)

(58) Field of Classification Search
CPC .. G06T 7/74; G06T 2207/30241; G01S 17/89
See application file for complete search history.

(56) References Cited

U.S. PATENT DOCUMENTS

| 5,349,916 A | 9/1994 | Hillenbrand et al. |
| 5,729,475 A | 3/1998 | Romanik, Jr. |

(Continued)

FOREIGN PATENT DOCUMENTS

| CN | 102928431 A | 2/2013 |
| CN | 109458928 A | 3/2019 |

(Continued)

OTHER PUBLICATIONS

Office Communication for U.S. Appl. No. 18/222,780 mailed Sep. 15, 2023, 10 Pages.

(Continued)

*Primary Examiner* — Jamil Ahmed
(74) *Attorney, Agent, or Firm* — John W. Branch; Branch Partners PLLC

(57) ABSTRACT

Embodiments are directed to the association of concurrent tracks across multiple views for sensing objects. A sensing system that employs signal beams to scan paths across an object may be provided such that two or more sensors separately detect signals reflected by the object. Events may be determined based on the detected signals such that the events include pairs of events that correspond to pairs of sensors. Essential matrices may be generated based on the positions of each pair of sensors. The pairs of events associated with the pairs of sensors may be compared based on the essential matrices of the sensors. Scores for the pairs of events may be provided based on the comparison. If a score for a pair of events may be less than a threshold value, each event in the pair of events may be associated with a same location on the object.

32 Claims, 21 Drawing Sheets

(56) References Cited

U.S. PATENT DOCUMENTS

| | | |
|---|---|---|
| 6,748,112 B1 | 6/2004 | Nguyen et al. |
| 7,198,195 B2 | 4/2007 | Bobba et al. |
| 8,047,149 B1 | 11/2011 | Antonelli et al. |
| 8,353,457 B2 | 1/2013 | Olmstead |
| 9,117,267 B2 | 8/2015 | Francis, Jr. et al. |
| 9,489,735 B1 | 11/2016 | Reitmayr |
| 10,213,645 B1 | 2/2019 | Wu et al. |
| 11,703,315 B2 | 7/2023 | Dapore |
| 11,704,835 B2 | 7/2023 | Cullen et al. |
| 11,785,200 B1 | 10/2023 | Smits et al. |
| 11,808,857 B2 | 11/2023 | Cullen et al. |
| 11,887,340 B2 | 1/2024 | Cullen et al. |
| 11,974,055 B2 | 4/2024 | Smits et al. |
| 12,111,180 B2 | 10/2024 | Paden |
| 12,148,185 B2 | 11/2024 | Cullen et al. |
| 12,262,127 B2 | 3/2025 | Smits et al. |
| 12,276,730 B2 | 4/2025 | Smits et al. |
| 12,401,905 B2 | 8/2025 | Smits et al. |
| 12,416,804 B1 | 9/2025 | Smits et al. |
| 2002/0008791 A1 | 1/2002 | Okamori et al. |
| 2007/0090180 A1 | 4/2007 | Griffis et al. |
| 2008/0012850 A1 | 1/2008 | Keating, III |
| 2008/0165360 A1 | 7/2008 | Johnston |
| 2008/0201101 A1* | 8/2008 | Hebert ............... G06T 7/521 702/152 |
| 2009/0087029 A1 | 4/2009 | Coleman et al. |
| 2009/0096994 A1 | 4/2009 | Smits |
| 2011/0122233 A1 | 5/2011 | Kasai et al. |
| 2011/0273442 A1 | 11/2011 | Drost et al. |
| 2014/0105506 A1 | 4/2014 | Drost et al. |
| 2014/0368614 A1 | 12/2014 | Imai et al. |
| 2015/0378023 A1 | 12/2015 | Royo Royo et al. |
| 2016/0096477 A1 | 4/2016 | Biemer |
| 2016/0180574 A1 | 6/2016 | Kaminitz et al. |
| 2016/0259168 A1 | 9/2016 | Katz et al. |
| 2017/0035281 A1 | 2/2017 | Takeuchi et al. |
| 2017/0068861 A1 | 3/2017 | Miller et al. |
| 2017/0142393 A1 | 5/2017 | Oggier |
| 2017/0176575 A1 | 6/2017 | Smits |
| 2017/0195589 A1 | 7/2017 | Kovacovsky et al. |
| 2018/0180733 A1 | 6/2018 | Smits |
| 2019/0072770 A1 | 3/2019 | Hall |
| 2019/0128665 A1 | 5/2019 | Harendt |
| 2019/0213309 A1 | 7/2019 | Morestin et al. |
| 2019/0235081 A1 | 8/2019 | Smits |
| 2019/0258869 A1 | 8/2019 | Stelzer et al. |
| 2019/0279379 A1 | 9/2019 | Srinivasan et al. |
| 2019/0310351 A1 | 10/2019 | Hughes et al. |
| 2020/0075658 A1 | 3/2020 | Kato et al. |
| 2020/0142073 A1 | 5/2020 | Gassend et al. |
| 2020/0160012 A1 | 5/2020 | Nunnink et al. |
| 2020/0264414 A1 | 8/2020 | Svec |
| 2020/0280664 A1 | 9/2020 | Lee et al. |
| 2021/0023714 A1 | 1/2021 | Zhang et al. |
| 2021/0037229 A1 | 2/2021 | Maykol Gomes Pinto et al. |
| 2021/0080548 A1 | 3/2021 | Beuschel et al. |
| 2021/0141094 A1 | 5/2021 | Russ et al. |
| 2021/0261159 A1 | 8/2021 | Pazhayampallil et al. |
| 2021/0278539 A1 | 9/2021 | Laddha et al. |
| 2021/0304574 A1 | 9/2021 | Ramanathan et al. |
| 2022/0156998 A1 | 5/2022 | Lee et al. |
| 2022/0187461 A1 | 6/2022 | Cullen |
| 2022/0222845 A1 | 7/2022 | Inada |
| 2022/0287676 A1 | 9/2022 | Steines et al. |
| 2023/0003549 A1 | 1/2023 | Paden |
| 2023/0015889 A1 | 1/2023 | Cullen et al. |
| 2023/0034733 A1 | 2/2023 | Cullen et al. |
| 2023/0060421 A1 | 3/2023 | Cullen et al. |
| 2023/0230212 A1 | 7/2023 | García et al. |
| 2023/0274523 A1 | 8/2023 | Paden et al. |
| 2023/0316657 A1 | 10/2023 | Smits et al. |
| 2023/0360268 A1 | 11/2023 | Cullen et al. |
| 2024/0022819 A1 | 1/2024 | Smits et al. |
| 2024/0040274 A1 | 2/2024 | Smits et al. |
| 2024/0114235 A1 | 4/2024 | Gallagher et al. |
| 2024/0129645 A1 | 4/2024 | Smits et al. |
| 2024/0329248 A1 | 10/2024 | Smits et al. |
| 2025/0027765 A1 | 1/2025 | Paden |
| 2025/0056133 A1 | 2/2025 | Smits et al. |
| 2025/0277901 A1 | 9/2025 | Smits et al. |
| 2025/0321337 A1 | 10/2025 | Smits et al. |

FOREIGN PATENT DOCUMENTS

| | | |
|---|---|---|
| CN | 112365585 A | 2/2021 |
| CN | 112750168 A | 5/2021 |
| CN | 113313710 A | 8/2021 |
| CN | 115115760 A | 9/2022 |
| CN | 116829902 A | 9/2023 |
| EP | 4260006 A1 | 6/2022 |
| JP | H06-94428 A | 4/1994 |
| JP | H11-64229 A | 3/1999 |
| JP | 2000-231344 A | 8/2000 |
| JP | 2009-243986 A | 10/2009 |
| JP | 2018-195240 A | 12/2018 |
| JP | 2020-52719 A | 4/2020 |
| JP | 2020-64011 A | 4/2020 |
| JP | 2020-514713 A | 5/2020 |
| JP | 2020-106475 A | 7/2020 |
| JP | 2021-167776 A | 10/2021 |
| JP | 2024-501078 A | 1/2024 |
| KR | 10-2021-0075563 A | 6/2021 |
| WO | 2013/093459 A2 | 6/2013 |
| WO | 2014/060564 A1 | 4/2014 |
| WO | 2018000037 A1 | 1/2018 |
| WO | 2018125850 A1 | 7/2018 |
| WO | 2019189381 A1 | 10/2019 |
| WO | 2020/061214 A1 | 3/2020 |
| WO | 2020080237 A1 | 4/2020 |
| WO | 2021039022 A1 | 3/2021 |
| WO | 2021140886 A1 | 7/2021 |
| WO | 2022132828 A1 | 6/2022 |
| WO | 2023/278868 A1 | 1/2023 |
| WO | 2023/288067 A1 | 1/2023 |
| WO | 2023/009755 A1 | 2/2023 |
| WO | 2023/028226 A1 | 3/2023 |
| WO | 2023/096873 A1 | 6/2023 |
| WO | 2023/164064 A1 | 8/2023 |
| WO | 2023/177692 A1 | 9/2023 |
| WO | 2023/196225 A1 | 10/2023 |
| WO | 2024/025865 A1 | 2/2024 |

OTHER PUBLICATIONS

Office Communication for U.S. Appl. No. 18/225,833 mailed Sep. 15, 2023, 19 Pages.

Office Communication for U.S. Appl. No. 18/130,080 mailed Sep. 28, 2023, 43 Pages.

Office Communication for U.S. Appl. No. 17/551,054 mailed May 27, 2025, 26 Pages.

Extended European Search Report for European Patent Application No. 22862080.3 mailed Jun. 16, 2025, 6 Pages.

Li et al., "Enhancing 3-D LiDAR Point Clouds With Event-Based Camera", IEEE Transactions on Instrumentation and Measurement, vol. 70, 9511712, 2021, 12 pages.

Gehriu et al., "DSEC: A Stereo Event Camera Dataset for Driving Scenarios", IEEE Robotics and Automation Letters, Preprint Version, Accepted Feb. 2021, 8 pages.

Office Communication for U.S. Appl. No. 19/203,054 mailed Jul. 7, 2025, 10 Pages.

Office Communication for U.S. Appl. No. 18/113,283 mailed Jul. 16, 2025, 13 Pages.

Office Communication for U.S. Appl. No. 17/551,054 mailed Aug. 4, 2025, 3 Pages.

Office Communication for JP Patent Application No. 2023-560251 mailed Sep. 1, 2025, 7 Pages including English Translation.

Office Communication for U.S. Appl. No. 19/035,554 mailed Aug. 7, 2025, 8 Pages.

Office Communication for U.S. Appl. No. 19/242,542 mailed Aug. 6, 2025, 8 Pages.

(56) References Cited

OTHER PUBLICATIONS

Office Communication for U.S. Appl. No. 19/242,542 mailed Aug. 26, 2025, 10 Pages.
Office Communication for U.S. Appl. No. 19/059,517 mailed Aug. 12, 2025, 23 Pages.
Liu et al., "Automatic fishing net detection and recognition based on optical gated viewing for underwater obstacle avoidance," Optical Engineering, vol. 56 No. 8, Aug. 2017, pp. 083101-1-083101-7.
Russell et al., "Underwater spectral reflectance measurements: the reflectance standard submersion factor and its impact on derived target reflectance," Applied Optics, vol. 62, No. 24, Aug. 20, 2023, pp. 6299-6306.
Weng et al., "Scalable laser-based underwater wireless optical communication solution between autonomous underwater vehicle fleets," Applied Optics, vol. 62, No. 31, Nov. 2023, pp. 8261-8271.
International Search Report and Written Opinion for International Patent Application No. PCT/US2025/034271 mailed Sep. 9, 2025, 9 Pages.
Ahn et al., "Kaleidoscopic structured light", ACM Transactions on Graphics, vol. 40, Issue 6, No. 214, Dec. 2021, pp. 1-15.
Office Communication for U.S. Appl. No. 17/551,054 mailed Oct. 22, 2025, 8 Pages.
International Search Report and Written Opinion for International Patent Application No. PCT/US2021/063399 mailed Mar. 22, 2022, pp. 1-7.
International Search Report and Written Opinion for International Patent Application No. PCT/US2022/036006 mailed Oct. 4, 2022, pp. 1-8.
International Search Report and Written Opinion for International Patent Application No. PCT/US2022/037299 mailed Oct. 25, 2022, pp. 1-7.
International Search Report and Written Opinion for International Patent Application No. PCT/US2022/038724 mailed Nov. 1, 2022, pp. 1-7.
International Search Report and Written Opinion for International Patent Application No. PCT/US2022/041520 mailed Nov. 8, 2022, pp. 1-7.
International Search Report and Written Opinion for International Patent Application No. PCT/US2023/013718 mailed May 30, 2023, pp. 1-7.
Office Communication for U.S. Appl. No. 18/130,080 mailed Jun. 20, 2023, pp. 1-36.
Office Communication for U.S. Appl. No. 17/895,489 mailed Jul. 5, 2023, pp. 1-13.
International Search Report and Written Opinion for International Patent Application No. PCT/US2023/015227 mailed Jun. 27, 2023, pp. 1-7.
Office Communication for U.S. Appl. No. 18/121,486 mailed Aug. 16, 2023, pp. 1-2.
International Preliminary Report on Patentability for International Patent Application No. PCT/US2021/063399 mailed Jun. 29, 2023, pp. 1-5.
International Search Report and Written Opinion for International Patent Application No. PCT/US2023/017271 mailed Jul. 11, 2023, pp. 1-7.
Office Communication for U.S. Appl. No. 18/121,486 mailed Aug. 3, 2023, pp. 1-10.
Office Communication for U.S. Appl. No. 17/865,794 mailed Aug. 21, 2024, 12 Pages.
International Preliminary Report on Patentability for International Patent Application No. PCT/US2023/015227 mailed Sep. 26, 2024, 5 Pages.
Office Communication for U.S. Appl. No. 18/504,052 mailed Aug. 22, 2024, 7 Pages.
International Preliminary Report on Patentability for International Patent Application No. PCT/US2023/013718 mailed Sep. 6, 2024, 5 Pages.
International Preliminary Report on Patentability for International Patent Application No. PCT/US2023/017271 mailed Oct. 17, 2024, 5 Pages.
Office Communication for U.S. Appl. No. 18/618,909 mailed Nov. 20, 2024, 9 Pages.
Extended European Search Report for European Patent Application No. 21907668.4 mailed on Dec. 6, 2024, 10 pages.
Office Communication for U.S. Appl. No. 18/221,816 mailed Dec. 6, 2024, 27 Pages.
Office Communication for U.S. Appl. No. 18/504,052 mailed Dec. 9, 2024, 6 Pages.
International Preliminary Report on Patentability for International Patent Application No. PCT/US2023/028551 mailed Feb. 6, 2025, 07 Pages.
Office Communication for U.S. Appl. No. 18/221,816 mailed May 14, 2025, 9 Pages.
Office Communication for U.S. Appl. No. 17/876,333 mailed Feb. 21, 2023, pp. 1-22.
Office Communication for U.S. Appl. No. 17/876,333 mailed Mar. 1, 2023, pp. 1-2.
International Search Report and Written Opinion for International Patent Application No. PCT/US2022/050626 mailed Mar. 7, 2023, pp. 1-8.
Office Communication for U.S. Appl. No. 17/895,489 mailed Apr. 11, 2023, pp. 1-36.
International Search Report and Written Opinion for International Patent Application No. PCT/US2023/028551 mailed Oct. 24, 2023, 09 Pages.
Office Communication for U.S. Appl. No. 17/551,054 mailed Jul. 16, 2024, 12 Pages.
Office Communication for U.S. Appl. No. 17/856,690 mailed Jul. 10, 2024, 11 Pages.
Office Communication for U.S. Appl. No. 17/856,690 mailed Jul. 24, 2024, 4 Pages.
International Preliminary Report on Patentability for International Patent Application No. PCT/US2022/036006 mailed Jan. 11, 2024, 6 Pages.
International Preliminary Report on Patentability for International Patent Application No. PCT/US2022/037299 mailed Jan. 25, 2024, 5 Pages.
International Preliminary Report on Patentability for International Patent Application No. PCT/US2022/038724 mailed Feb. 8, 2024, 5 Pages.
International Preliminary Report on Patentability for International Patent Application No. PCT/US2022/041520 mailed Mar. 7, 2024, 5 Pages.
International Preliminary Report on Patentability for International Patent Application No. PCT/US2022/050626 mailed Jun. 6, 2024, 6 Pages.
Office Communication for U.S. Appl. No. 18/488,123 mailed Jan. 2, 2024, 10 Pages.
Office Communication for U.S. Appl. No. 18/113,283 mailed Nov. 4, 2025, 11 Pages.
Office Communication for U.S. Appl. No. 18/113,283 mailed Nov. 18, 2025, 2 Pages.

\* cited by examiner

ASSOCIATION OF CONCURRENT TRACKS ACROSS MULTIPLE VIEWS

CROSS-REFERENCE TO RELATED APPLICATION

This application is a Utility patent application based on previously filed U.S. Provisional Patent Application Ser. No. 63/266,310 filed on Dec. 31, 2021, and U.S. Provisional Patent Application Ser. No. 63/264,609 filed on Nov. 28, 2021, the benefit of the filing date of which is hereby claimed under 35 U.S.C. § 119(e), and the contents of each application is incorporated herein expressly by reference.

TECHNICAL FIELD

The present invention relates generally to machine sensing or machine vision systems, and more particularly, but not exclusively, to association of concurrent tracks across multiple views.

BACKGROUND

The state of the art in robotic vision is largely based on cameras where the input to the sensing system is two-dimensional (2D) arrays of pixels that encode the amount of light that each pixel received over an exposure period, or on depth capture technologies (e.g., Time-of-Flight (ToF) cameras, structured light cameras, LIDAR, RADAR, or stereo cameras, to name a few) which provide three-dimensional (3D) point clouds, where each point in the point cloud may store its position in space with respect to the sensing system, and may store any of a number of other data associated with the patch of reflecting material that the point was generated from (e.g., brightness, color, relative radial velocity, spectral composition, to name a few). Note that 3D point clouds may be represented in "frames", similar in spirit to the frames of images from cameras, meaning that they don't have a fundamental representation of continuously evolving time.

To provide useful perception output that may be used by machine vision applications, such as, robotic planning and control systems, these 2D or 3D data often need to be processed by machine vision algorithms implemented in software or hardware. In some cases, some machine vision systems may employ machine learning to determine properties or features of the world that may be salient to particular robotic tasks, such as, the location, shape orientation, material properties, object classification, object motion, relative motion of the robotic system, or the like. In many cases, neither the 2D nor 3D representations employed by conventional machine vision systems provide inherent/native support for continuous surface representation of objects in the environment.

In some cases, scanning systems may employ multiple scanning sensors (e.g., image cameras, event cameras, or the like) to concurrently scan the same scenes or objects. In some cases, each sensor may independently collect scanning information based on the particular viewpoint of the sensor. Often it may be difficult for machine vision applications to efficiently or effectively determine if scanning information from different sensors represent the same points or objects in the scanned subject matter. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
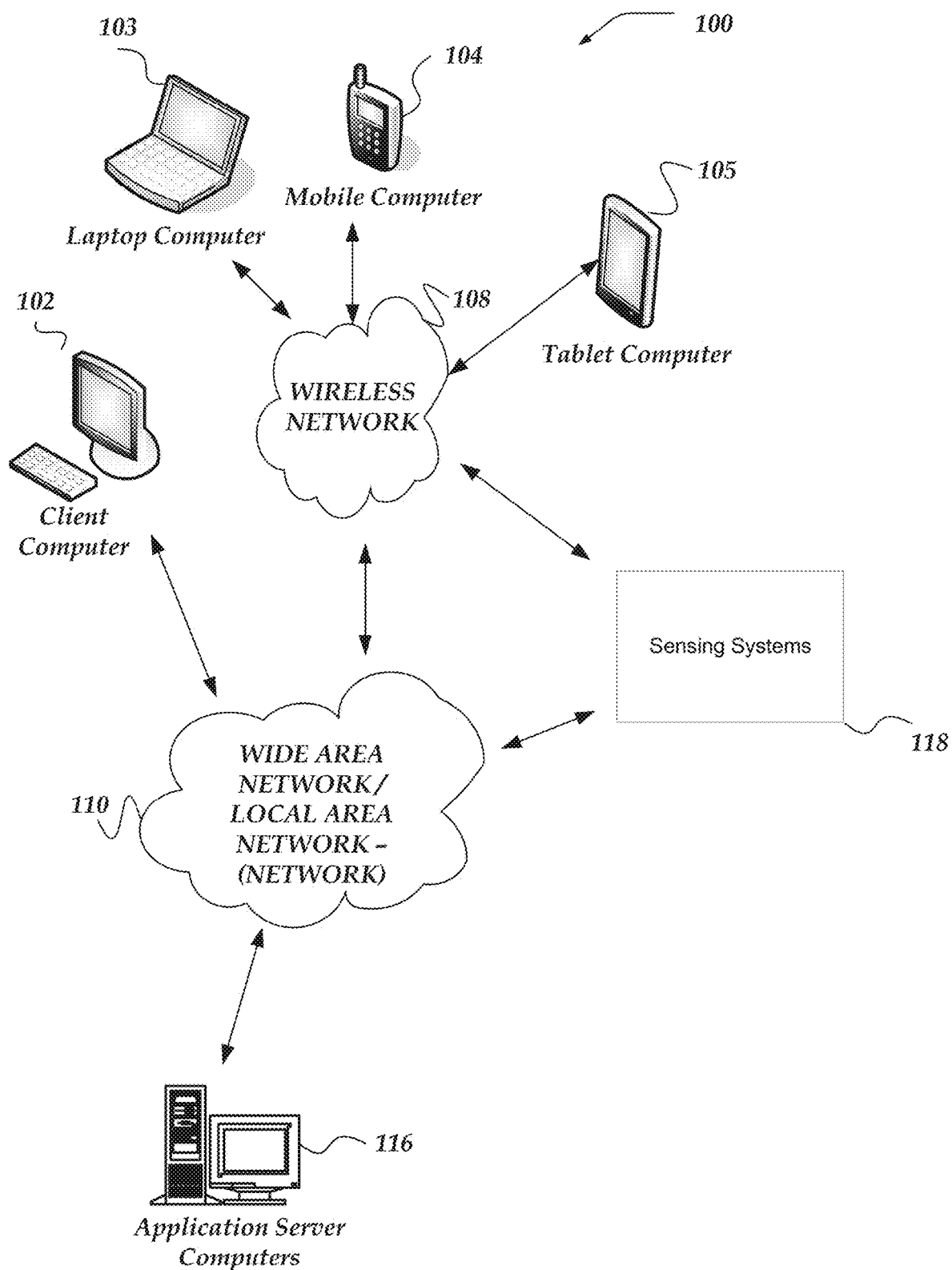
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "scanning signal generator," or "signal generator" refer to a system or a device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generators are not strictly limited to lasers or laser MEMS, other types of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan various frequencies, including up to 10s of kHz. The scanning signal generators may be controlled in a closed loop fashion with one or more processors that may provide feedback about objects in the environment and instructs the scanning signal generator to modify its amplitudes, frequencies, phase, or the like.

As used herein the term "event sensor" refers to a device or system that detects reflected energy from scanning signal generators. Event sensors may be considered to comprise an array of detector cells that are responsive to energy reflected from scanning signal generators. Event sensors may provide outputs that indicate which detector cells are triggered and the time they are triggered. Event sensors may be considered to generate a sensor output ("events") that reports the triggered cell location and time of detection for individual cells rather than being limited reporting the state or status of every cell. For example, event sensors may include event sensor cameras, SPAD arrays, SiPM arrays, or the like.

As used herein the term "image sensor" refers to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras.

As used herein the terms "trajectory," "parametric trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to the association of concurrent tracks across multiple views for sensing objects. In one or more of the various embodiments, a sensing system that employs two or more signal beams to scan a plurality of paths across an object may be provided such that two or more sensors separately detect signals from the two or more signal beams reflected by the object.

In one or more of the various embodiments, a plurality of events may be determined based on the separately detected signals such that the plurality of events include one or more pairs of events that correspond to one or more pairs of sensors.

In one or more of the various embodiments, one or more essential matrices may be generated based on one or more position characteristics of the two or more sensors such that each essential matrix corresponds to each pair of sensors.

In one or more of the various embodiments, the one or more pairs of events associated with the one or more pairs of sensors may be compared based on each essential matrix that corresponds to each pair of sensors.

In one or more of the various embodiments, one or more error scores for the one or more pairs of events may be provided based on the comparison.

In one or more of the various embodiments, in response to an error score for a pair of events being less than a threshold value, each event in the pair of events may be associated with a same point location on the scanned object such that triangulation of the point location may be employed to determine at least a three-dimensional position on the object.

In one or more of the various embodiments, comparing the one or more pairs of events associated with the one or more pairs of sensors may include substituting a fundamental matrix that corresponds to each pair of sensors for the essential matrix.

In one or more of the various embodiments, determining the plurality of events based on the separately detected signals may include: providing a time window based on one or more of one or more characteristics of the sensing system or one or more characteristics of the object; detecting two or more signals that occur within the time window; determining the plurality of events based on the one or more detected signals; or the like.

In one or more of the various embodiments, one or more parametric trajectories may be generated based on the plurality of events such that each parametric trajectory may be a parametric representation of a one-dimensional curve segment in a three-dimensional space. In some embodiments, the one or more pairs of events may be determined based on the one or more parametric trajectories such that each event corresponds to a point on a parametric trajectory.

In one or more of the various embodiments, determining the plurality of events based on the separately detected signals may include: generating a plurality of parametric trajectories based on the detected signals such that each parametric trajectory may be a parametric representation of a one-dimensional curve segment in a three-dimensional space. In some embodiments, each parametric trajectory may be associated with a separate sensor based on which sensor may be associated with the detected signals that correspond to each parametric trajectory. In some embodiments, one or more points from each parametric trajectory may be determined based on the curve segment that fits the parametric trajectory. And, in some embodiments, one or more events may be generated based on the one or more points.

In one or more of the various embodiments, the sensing system may include generating the two or more signal beams based on one or more lasers that may be included in the sensing system.

In one or more of the various embodiments, the two or more sensors include one or more of an event sensor or an image sensor.

In one or more of the various embodiments, determining the plurality of events based on the separately detected signals may include: determining a position on a sensor that detects the separately detected signal; determining a time that corresponds to the time the sensor detects the separately detected signal; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)— (network) 110, wireless network 108, client computers 102-105, application server computer 116, sensing systems 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, sensing systems 118, or other computers.

Client computers 102-105 may further be configured to include a client application that enables an end-user to log into an end-user account that may be managed by another computer, such as application server computer 116, sensing systems 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, sensing systems 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or sensing systems 118 are described in more detail below in conjunction with FIG. 3. Although FIG. 1 illustrates application server computer 116 and sensing systems 118 each as a single computer, the innovations or embodiments are not so limited. For example, one or more functions of application server computer 116, sensing systems 118, or the like, may be distributed across one or more distinct network computers. Moreover, in one or more embodiments, sensing systems 118 may be implemented using a plurality of network computers. Further, in one or more of the various embodiments, application server computer 116, sensing systems 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
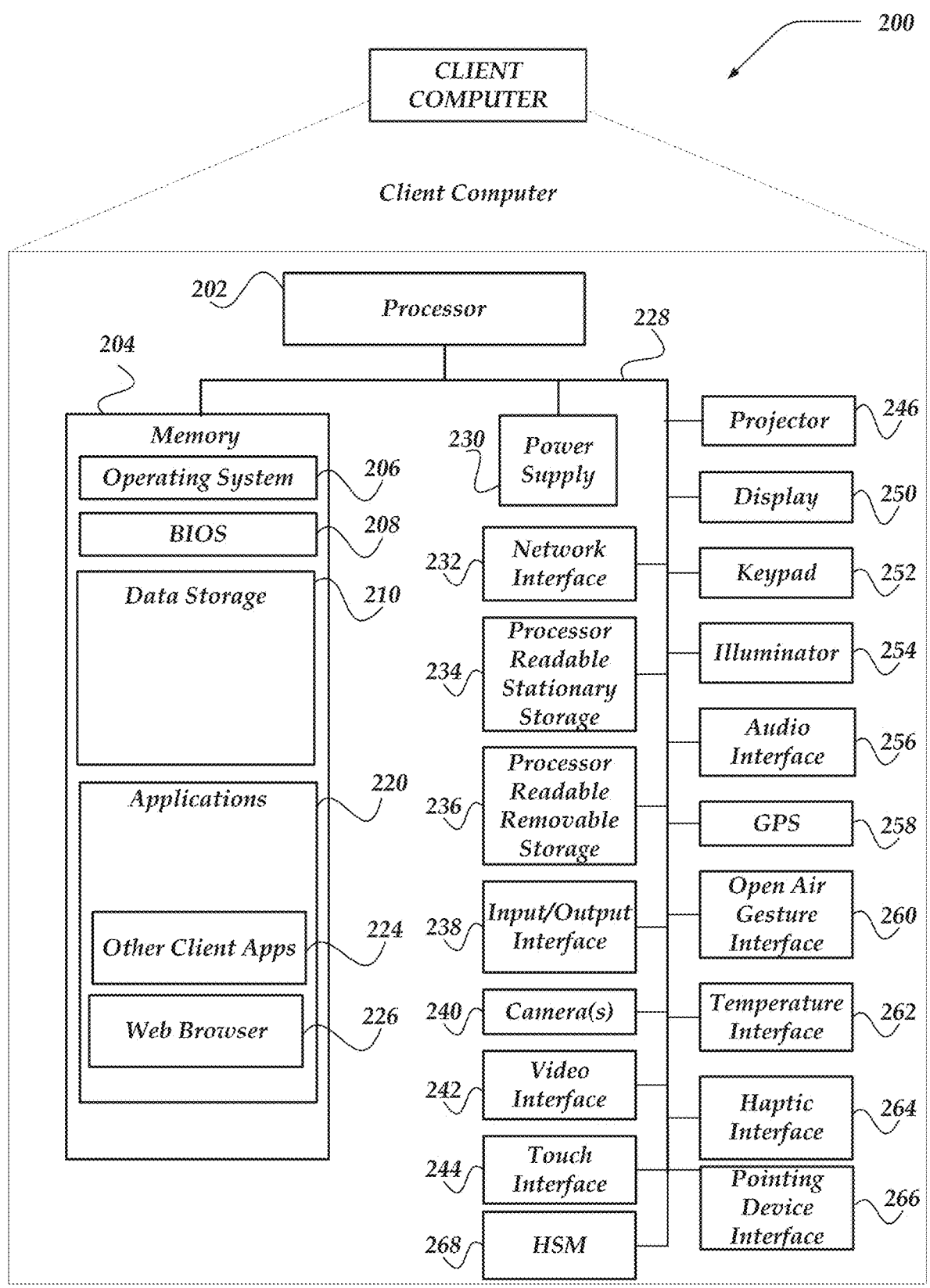
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
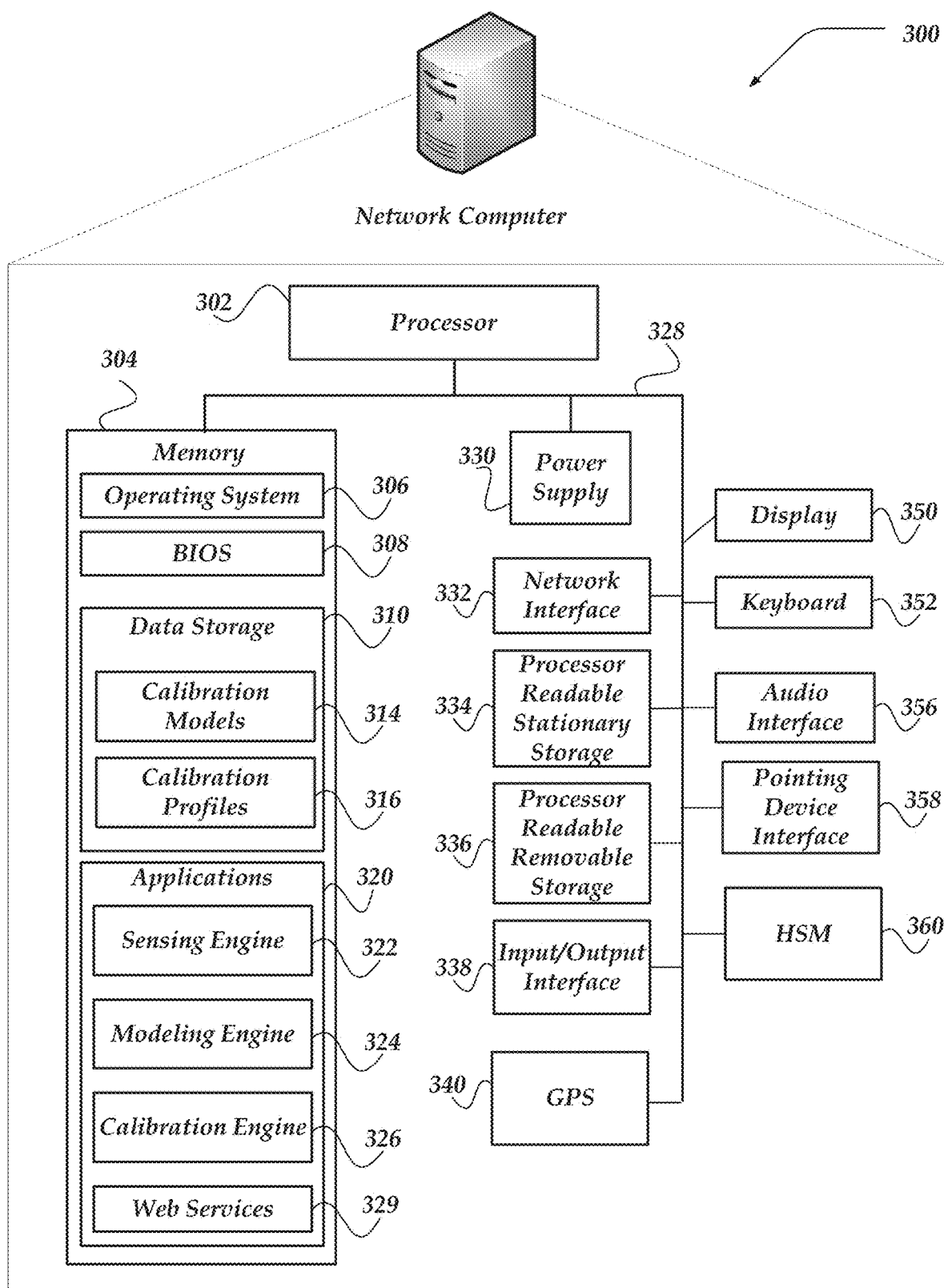
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or sensing systems 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, sensing engine 322, modeling engine 324, calibration engine 326, web services 329, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, calibration models 314, calibration profiles 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include sensing engine 322, modeling engine 324, calibration engine 326, web services 329, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 322, modeling engine 324, calibration engine 326, web services 329, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 322, modeling engine 324, calibration engine 326, web services 329, or the like, may be provisioned and de-commissioned automatically.

Also, in one or more of the various embodiments, sensing engine 322, modeling engine 324, calibration engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
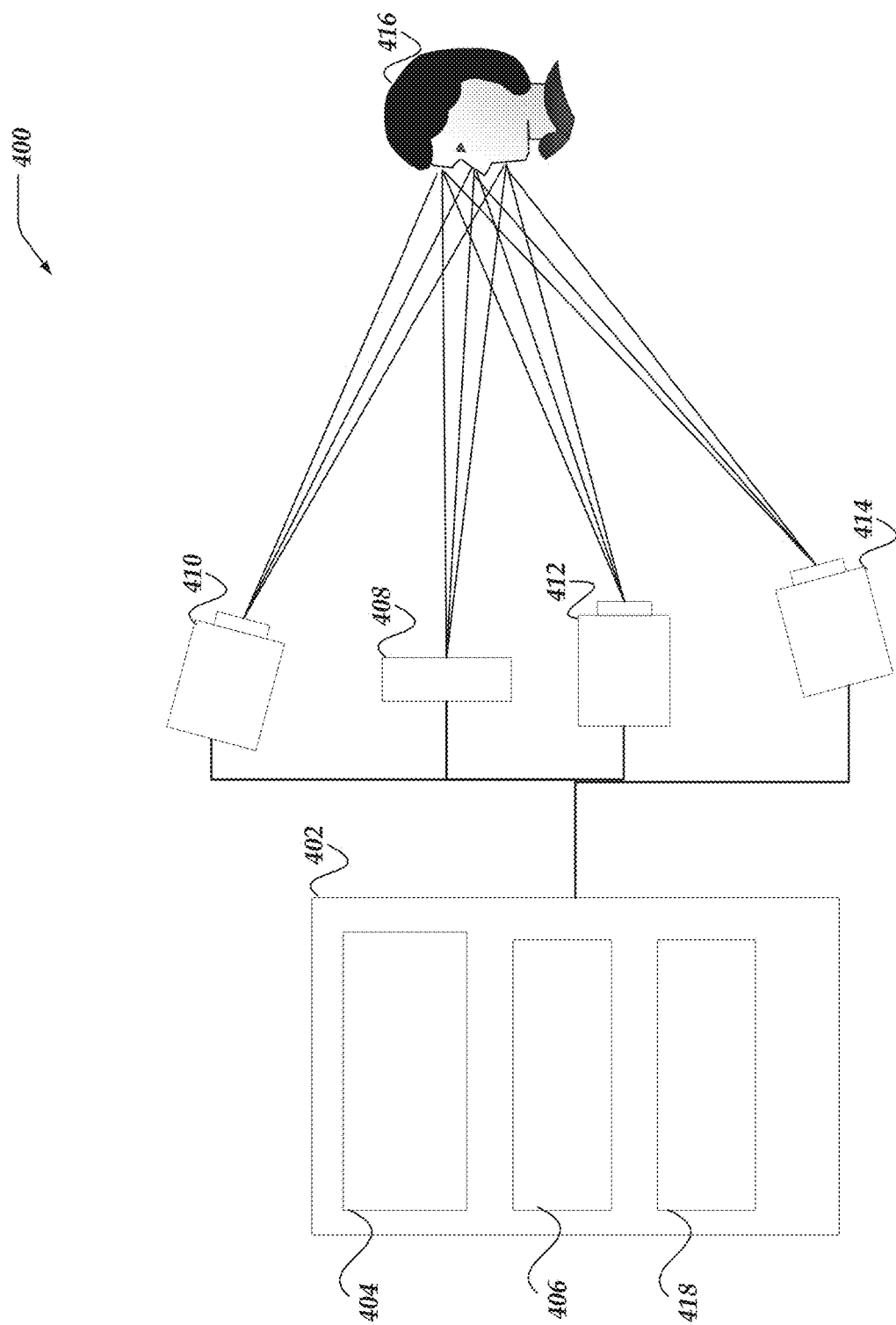
FIG. 4 illustrates a logical architecture of a system for association of concurrent tracks across multiple views in accordance with one or more of the various embodiments.

FIG. 4 illustrates a logical architecture of system 400 for association of concurrent tracks across multiple views in accordance with one or more of the various embodiments.

In this example, for some embodiments, sensing systems, such as system 400 may include one or more servers, such as sensing server 402. In some embodiments, sensing servers may be arranged to include: one or more sensing engines, such as, sensing engine 404; one or more modeling engines, such as, modeling engine 406; one or more calibration engines, such as, calibration engine 418.

Also, in some embodiments, sensing systems may include one or more signal generators that may at least generate sensor information based on where the energy from the signal generator reflects from a surface. In this example, for some embodiments, signal generator 408 may be considered to be a laser scanning system. Further, in some embodiments, sensing systems may include one or more event sensors that generate events based on the reflected signal energy (e.g., laser beam paths). Also, in some embodiments, sensing systems may include one or more image sensors that may be configured to capture scene information, reflected signal energy, or the like. In this example, for some embodiments, the sensors may be arranged to generate sensor information that corresponds to the reflected signal energy. In this example, sensors may include event sensor 410, event sensor 412, and event sensor 414.

Accordingly, in some embodiments, the 2D sensor information from each sensor may be provided to a sensing engine, such as, sensing engine 404. In some embodiments, sensing engines may be arranged to synthesize the 2D points provided by the sensors into 3D points based on triangulation, or the like.

Further, in some embodiments, sensing engines may be arranged to direct the signal generator (e.g., scanning laser 408) to follow one or more patterns based on one or more path-functions. Thus, in some embodiments, signal generators may scan the one or more objects or surface area using a known and precise scanning path that may be defined or described using one or more functions that correspond to the curve/path of the scanning.

Accordingly, in some embodiments, sensing engines may be arranged to synthesize information about the objects or surfaces scanned by the signal generate based on the 3D sensor information provided by the sensors and the known scanning curve pattern.

In some embodiments, scanning signal generator 408 may implemented using one or more fast laser scanning devices, such as a dual-axis MEMS mirror that scans a laser beam. In some embodiments, the wavelength of the laser may be in a broad range from the UV into the IR. In some embodiments, scanning signal generators may be designed to scan up to frequencies of 10s of kHz. In some embodiments, scanning signal generators may be controlled in a closed loop fashion using one or more processors that may provide feedback about the objects in the environment and instruct the scanning signal generator to adapt one or more of amplitude, frequency, phase, or the like. In some cases, for some embodiments, scanning signal generators may be arranged to periodically switch on and off, such as, at points if the scanner may be slowing before changing direction or reversing direction.

In some embodiments, system 400 may include one or more event sensors, such as, event sensor 410, event sensor 412, or the like. In some embodiments, event sensors may comprise arrays of pixels or cells that are responsive to reflected signal energy. In some embodiment, event sensors may be arranged such that some or all of the event sensors share a portion of their fields of view with one another and with the scanning signal generator. Further, in some embodiments, the relative position and poses of each sensor may be known. Also, in some embodiments, each event sensor may employ synchronized clocks. For example, in some embodiments, event sensors may be time synchronized by using a clock of one event sensor as the master clock or by using an external source that periodically sends a synchronizing signal to the event sensors. Alternatively, in some embodiments, sensors may be arranged to provide events to sensing engines independently or asynchronously of each other. In some embodiments, scanning event cameras may be employed as sensors.

Also, in some embodiments, system 400 may include one or more image sensors (not shown). In some embodiments, image sensors may be configured to capture one or more frames or images of the scene being sensed. In some embodiments, the captured images may include some or all of the same surface/objects being scanned by the signal generator.

Accordingly, as a beam from the scanning signal generator beam scans across the scene, the event sensors sense reflected signal energy (e.g., photons/light from lasers) and trigger events based on their cells/pixels that detect reflected signal energy in the scene. Accordingly, in some embodiments, each event (e.g., sensor event) generated by an event sensor may be determined based on cell location and a timestamp based on where and when the reflected energy is detected in each sensor. Thus, in some embodiments, each event sensor may report each sensor event independently as it is detected rather than collecting information/signal from the entire sensor array before providing the sensor event. This behavior may be considered distinguishable from image sensors that may include pixel arrays or CCDs which may 'raster scan' the entire array of cells before outputting signal data in the form of frame or images. In contrast, event sensors, such as, event sensor 410, event sensor 412, or the like, may immediately and continuously report signals (if any) from individual cells. Accordingly, the cells in an individual event sensor do not share a collective exposure time rather each cell reports its own detected events. Accordingly, in some embodiments, sensors, such as, event sensor 410, event sensor 412, or the like, may be based on event sensor cameras, single photon avalanche diode (SPAD) sensors, silicon photo-multipliers (SiPM) arrays, or the like.

Also, in some embodiments, in conjunction with events from event sensors, sensing system 400 may collect images from one or more image sensors, such as, image sensor 414. Accordingly, in one or more of the various embodiments, images may represent a snapshot in time of the scene being scanned.

Figure 5:
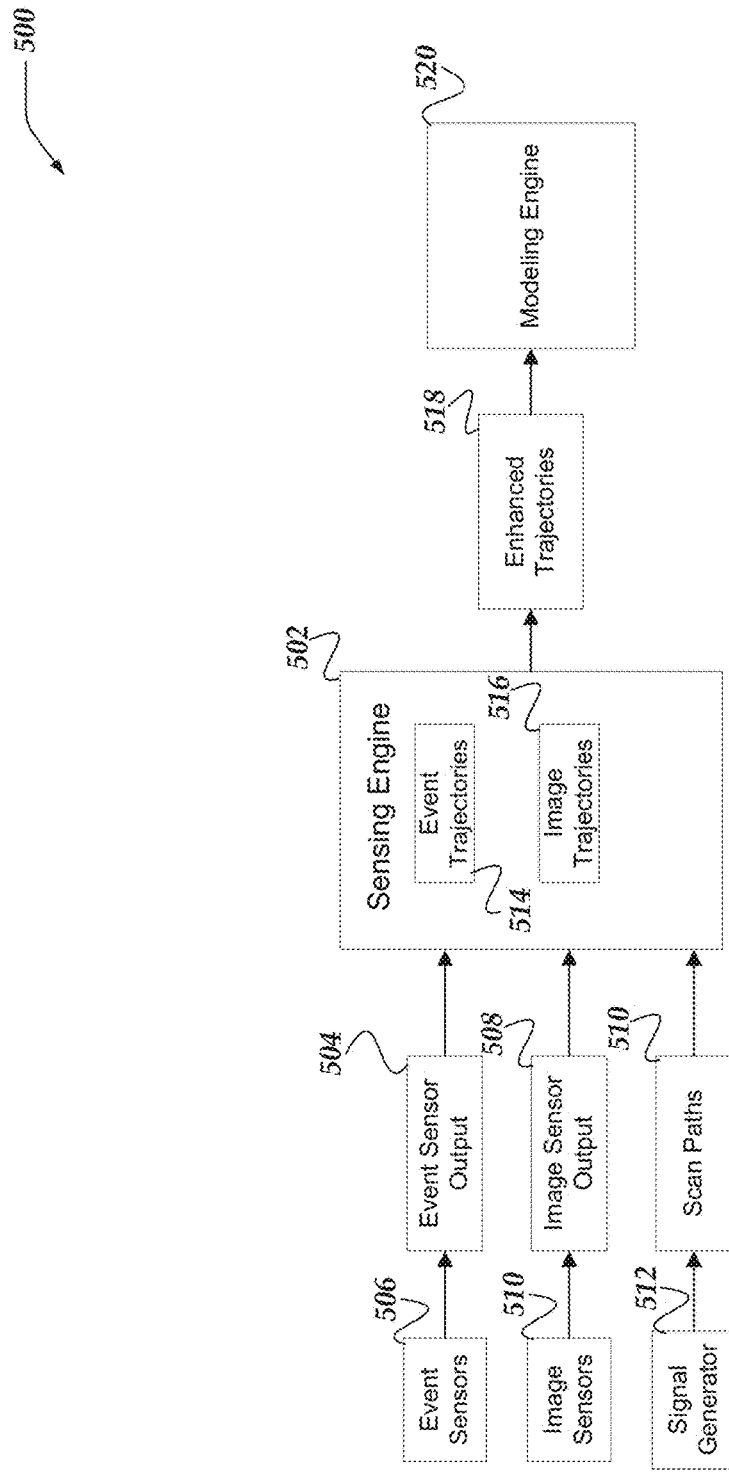
FIG. 5 illustrates a logical schematic of a system for association of concurrent tracks across multiple views in accordance with one or more of the various embodiments.

FIG. 5 illustrates a logical schematic of system 500 for association of concurrent tracks across multiple views in accordance with one or more of the various embodiments. In some embodiments, sensing engines, such as, sensing engine 502 may be arranged to be provided sensor outputs from one or more event sensors or one or more image sensors. In some embodiments, sensors outputs from event sensors may include information, such as, event hit location, pixel location, event timestamps, or the like, that may be associated with sensor events. Also, in some embodiments, sensor outputs may include images, frames, or the like, captured by image sensors. As described above, in some embodiments, signal generators, such as, scanning lasers may scan an area of interest such that reflections of the energy may be collected by one or more event sensors and one or more image sensors. Accordingly, in some embodiments, information from each sensor may be provided to sensing engine 502.

Also, in some embodiments, sensing engine 502 may be provided a scanning path that corresponds to the scanning path of the scanning signal generator. Accordingly, in some embodiments, sensing engine 502 may employ the scanning path to determine the path that the scanning signal generator traverses to scan the area of interest.

Accordingly, in some embodiments, sensing engine 502 may be arranged to recognize sensor events that may correspond to a surface location in three-dimensions based on the sensor output. For example, if there may be three sensors, the sensing engine may employ triangulation to compute the location in the area of interest where the scanning signal energy was reflected. One of ordinary skill in the art will appreciate that triangulation or other similar techniques may be applied to determine the scanned location if the position of the sensors is known.

In some embodiments, scanning signal generators (e.g., fast scanning lasers) may be configured to execute a precision scanning pattern. Accordingly, in some embodiments, sensing engine 502 may be provided the particular scanning path function. Also, in some embodiments, sensing engine 502 may be arranged to determine the particular scanning path based on configuration information to account for local circumstances of local requirements.

In one or more of the various embodiments, sensing engines, such as, sensing engine 502 may generate a sequence of surface trajectories that may be based the scan path and the sensor information synthesized from the sensor output 504.

Figure 6:
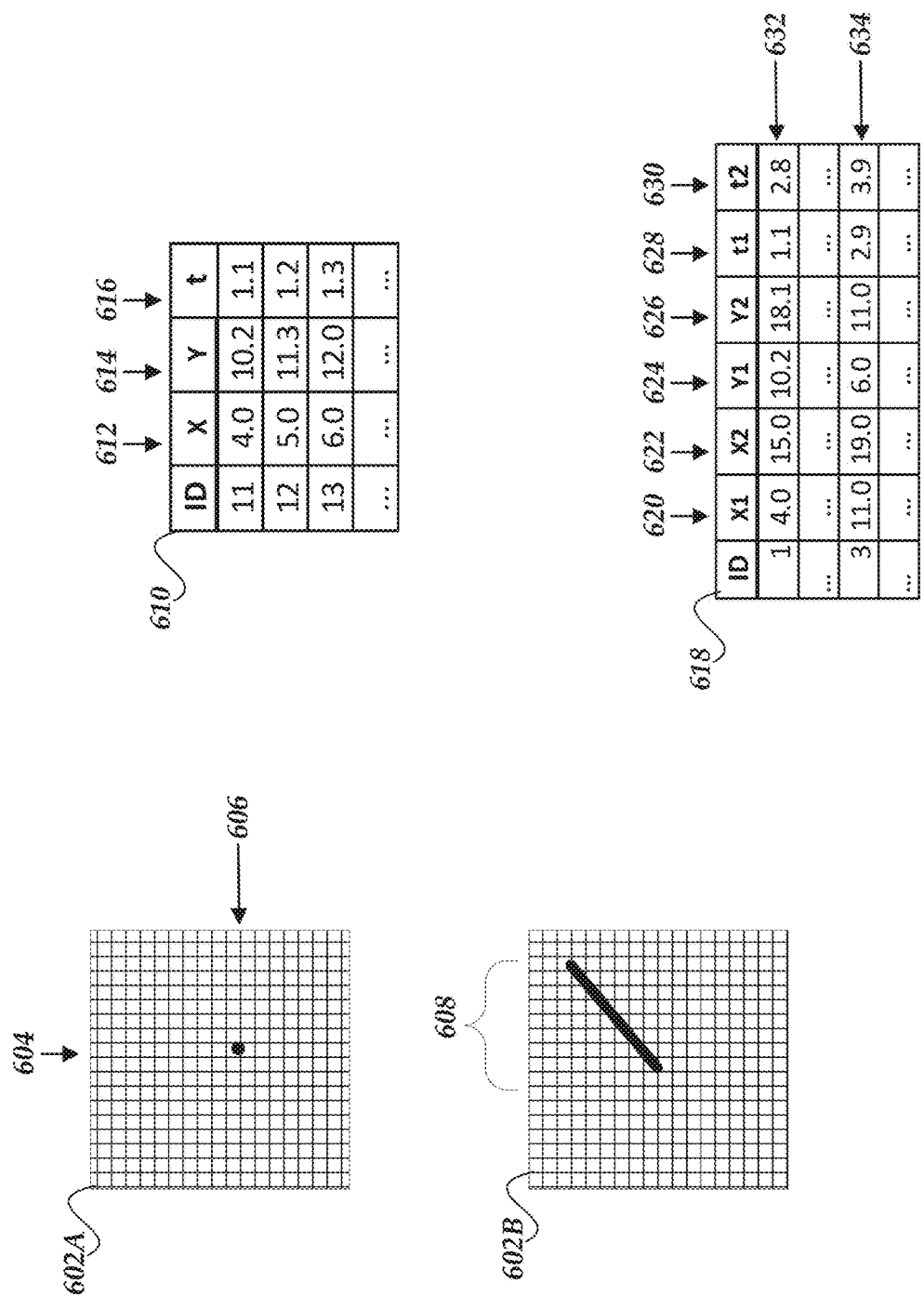
FIG. 6 illustrates a logical representation of sensors and sensor output information for multi-sensor superresolution scanning and capture system in accordance with one or more of the various embodiments.

FIG. 6 illustrates a logical representation of sensors and sensor output information for association of concurrent tracks across multiple views in accordance with one or more of the various embodiments.

In one or more of the various embodiments, sensing engines may be provided sensor output from various sensors. In this example, for some embodiments, sensor 602A may be considered to represent a generic sensor that may emit signals that correspond to the precise location on the sensor where reflected energy from the scanning signal generator may be detected. For example, sensor 602A may be considered an array of detector cells that reports the cell location of the cell that has detected energy reflected from the scanning signal generator. In this example, horizontal location 604 and vertical location 606 may be considered to represent a location corresponding to the location in sensor 602 where reflected signal energy has been detected.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employs triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a precise path/curve (e.g., scanning path). Accordingly, in some embodiments, the pattern or sequence of cells in the sensors that detect reflected energy will follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 608 may represent a sequence of cells in sensor 602B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using a various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to when the detection event occurred.

In this example, for some embodiments, data structure 610 may be considered a data structure for representing sensor events based on sensor output provided to a sensing engine. In this example, column 612 represents the horizontal position of the location in the scanning environment, column 614 represents a vertical position in the scanning environment, and column 616 represents the time of the event. Accordingly, in some embodiments, sensing engines may be arranged to determine which (if any) sensor events should be associated with a trajectory. In some embodiments, sensing engines may be arranged to be associated sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather being limited to provide sensor events computed based on outputs from multiple sensors. For example, in some embodiments, sensing engines may be arranged to provide a data structure similar to data structure 610 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 618 to represent a trajectory that may be determined based on the information captured by the sensors. In this example, data structure 610 may be table-like structure that includes columns, such as, column 620 for storing a first x-position, column 622 for storing a second x-position, column 624 for storing a first y-position, column 626 for storing a second y-position, column 628 for storing the beginning time of a trajectory, column 630 for storing an end time of a trajectory, of the like.

In this example, row 632 represents information for a first trajectory and row 634 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a smoothing Kalman filter to predict where the scanning beam point should have been in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to when the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 618 for each sensor.

Figure 7:
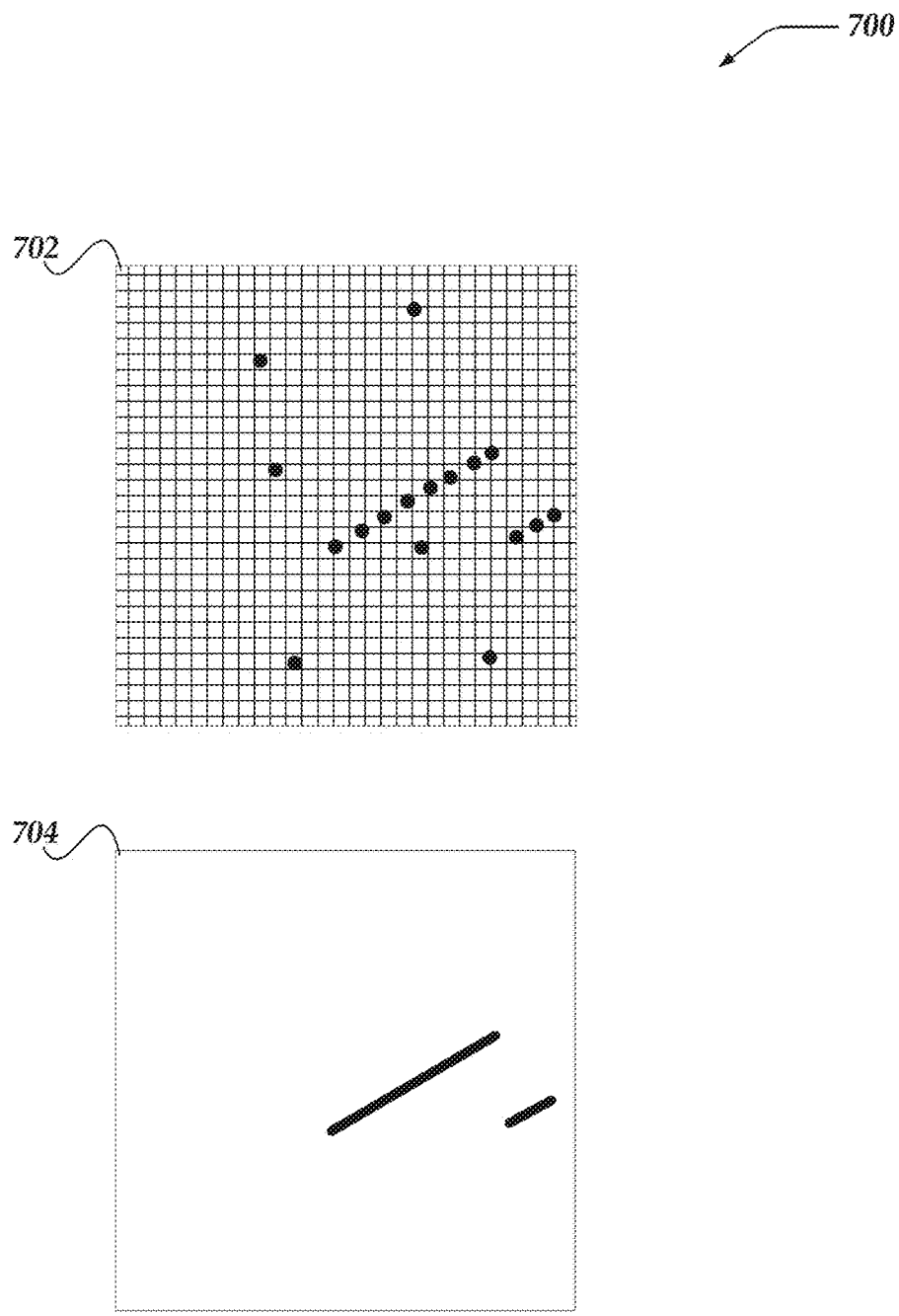
FIG. 7 illustrates a logical schematic of a system for association of concurrent tracks across multiple views in accordance with one or more of the various embodiments.

FIG. 7 illustrates a logical schematic of system 700 for association of concurrent tracks across multiple views in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 702 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 704.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines may be arranged to employ rules, instructions, heuristics, or the like, for classifying sensor events as noise that may be provided via configuration information to account for local requirements or local circumstances that may be associated with a sensing applications or sensors.

Figure 8A:
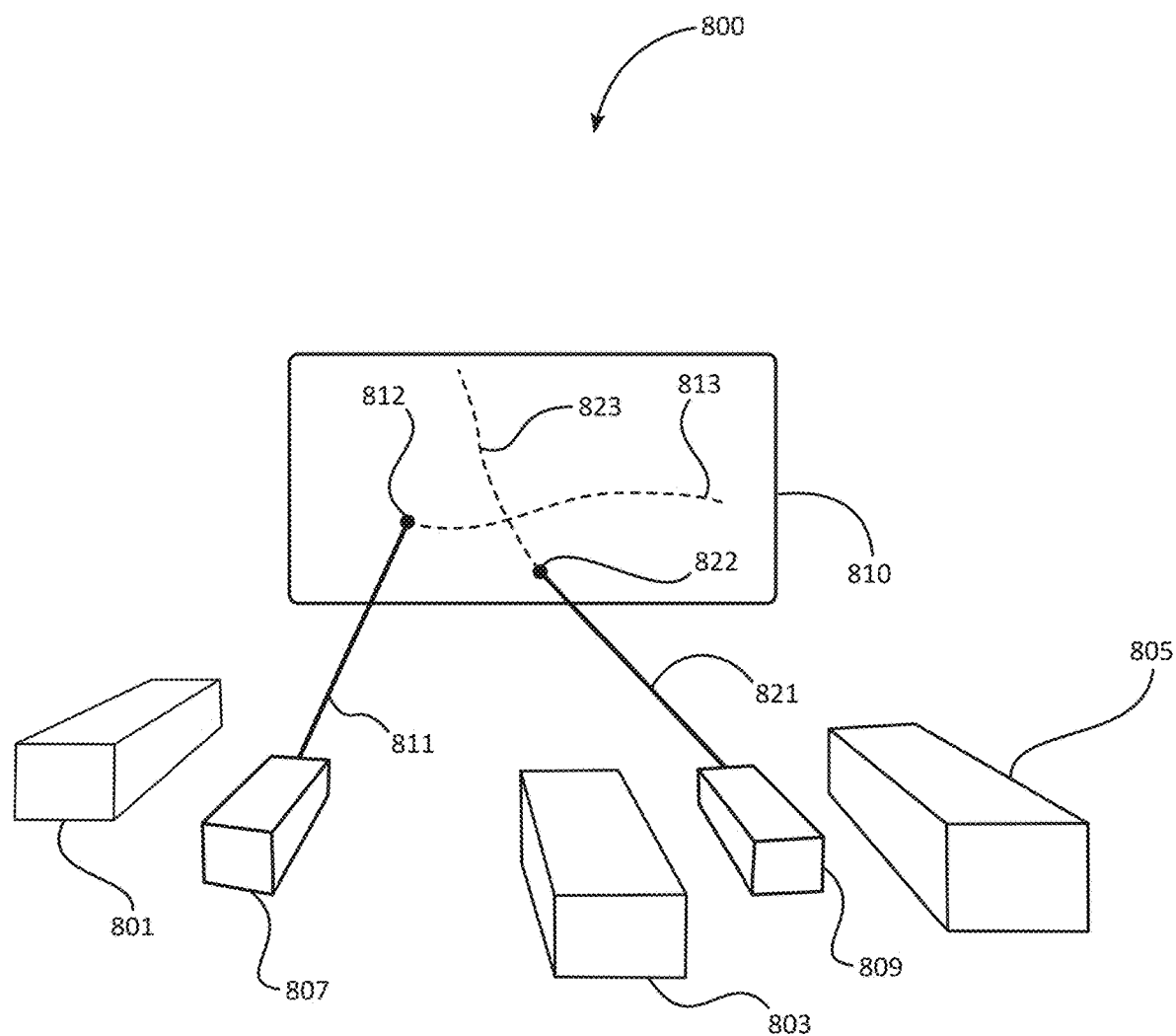
FIG. 8A illustrates a logical representation of a perspective view of a multiple beam scanning system in accordance with one or more of the various embodiments.

FIG. 8A shows a logical schematic of multi-camera sensing system 800 in accordance with one or more of the various embodiments.

In this example, for some embodiments, system 800 represents a plurality of beams provided by one or more signal generators (e.g., lasers) scanning over objects. In some embodiments, systems, such as, system 800 may be used for 3D image measurements or for other applications. In some embodiments, scanning laser 807 may be arranged to scan beam 811 across one or more objects. In this example, flat object 810 depicts the field of view of all the system cameras as well as within the scanning range. However, one of ordinary skill in the art will appreciate that the scanning targets may include multiple objects of various sizes and shapes. At any given time, beam 811 may reflect off a spot 812 on the surface of the object. In this example, path 813 (shown as a dotted line) represents a path traced out by the beam. Similarly, another scanning laser, such as, laser 809 may be used to scan beam 821 over objects in the scene. Trajectory 823 traced out by spot 822 may be on the same object (object 810) as beam 811 simultaneously, but may also be scanning other objects or the background of the scene at that time. Here only two beams are shown scanning object 810, but many more could be used as well.

In this example, system 800 may be represented as having three cameras (e.g., sensors), though two, four, or more could be used. In this example, camera 801, camera 803, and camera 805 may be considered to be event cameras, where each pixel in an event camera may independently report changes in light level at the pixel level. For example, typical events reported by event cameras may be reported in the form (x, y, t), where x and y are the positions of the event on the event camera sensor array, and t is the timestamp of the event.

In some embodiments, the resolution of the event cameras in time may be constrained by the speed at which the event camera may report events in the camera globally as well as effects including time jitter, event timestamp arbiter circuitry, and others. In some embodiments, event cameras have resolution of each event down to 1 μs. However, one of ordinary skill in the art will appreciate the resolution may depend on selected components that comprises the event cameras. Thus, in some cases, event cameras may be enabled to report events even faster as if improved components may be used. In some embodiments, event cameras may be implemented using CMOS light level changes at each pixel, avalanche photodiode arrays, single photon avalanche diode (SPAD) arrays, or other methods.

In some embodiments, scanning laser systems may be particularly good at triggering events at the camera, since the relatively bright reflections may be easily distinguishable from background light and other noise.

In some embodiments, because pixels in event cameras tend to be uncorrelated with each other, each pixel may in principle trigger at the same or similar times as many other pixels on the same sensor array of the same event camera. Further, in some embodiments, event cameras in system 800 may be time synchronized with each other down to the time resolution of the cameras.

In some embodiments, synchronization may be accomplished with signal cables between cameras, or otherwise in one embodiment may be accomplished by calculating the local time at each camera using crossing points of trajectories measured at all cameras substantially simultaneously. In a variant, a time coded signal may be embedded into the laser signal itself. In some embodiments, the particular method of synchronization may be considered less important than having the ability to match either events or curve fit portions of trajectories to equivalent events or trajectories measured substantially simultaneously among different cameras in the sensing system.

In conventional image analysis among cameras for 3D measurement, positions of cameras and then positions of 3D objects may be ascertained by using point correspondences, where collections of points, lines, and other objects may be extracted from the image scene at each camera. Often conventional determination of points to use from each camera perspective may lead to considerable error in the final result calculations, because often it may not be clear how the exact position of each point to be measured may be extracted precisely from each image; moreover, larger errors may result if features measured at each camera may be confused for similar looking features, leading to point mismatch.

In some embodiments, if using system 800 for an application such as 3D measurement of objects and if the position of a point such as point 812 may be measured precisely at a given time in more than one camera, the position of the point in 3D space may be calculated using triangulation. In this example, for some embodiments, errors at a particular point may be less likely, because rather than relying on measuring fiducial points for calculation from the imaged objects directly, the position of a beam scanned over the object may be used since the position of the spot measured at any given time may be ascertained more closely on each camera. In some embodiments, this may be simpler if there may be one beam scanning over the surface of the object. Also, in some embodiments, two or more beams may be scanned over the object simultaneously to increase the speed of scanning. In some embodiments, simultaneous scanning using two or more beams may enable higher resolutions scans. Also, in some embodiments, simultaneous scanning using two or more beams may enable higher resolutions scans if target object may be moving with respect to the scanning system.

In some embodiments, if there may be two or more points visible by each camera, there may be ambiguity in the point matching. For example, in some embodiments, it may be possible based on their current location for point 812 on camera 801 to be incorrectly matched with point 822 on camera 805, leading to an incorrect determination position of the 3D point calculated of the object. in some embodiments, such ambiguity may become more pronounced if there may be more points measured substantially simultaneously.

Figure 8B:
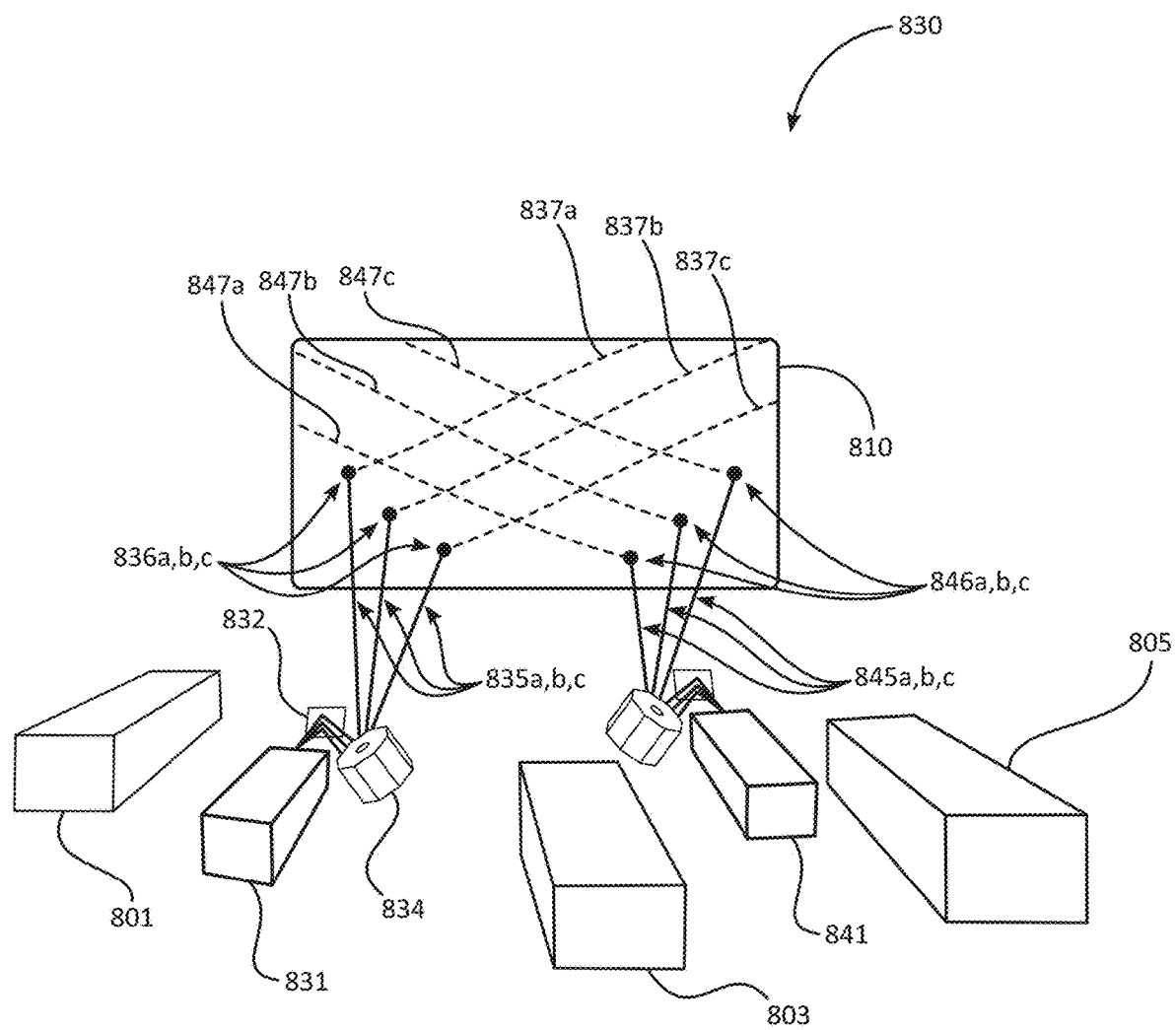
FIG. 8B illustrates a logical representation of a perspective view of another embodiment of a multiple beam scanning system in accordance with one or more of the various embodiments.

FIG. 8B illustrates a logical representation of a perspective view of system 830 for multiple beam scanning in accordance with one or more of the various embodiments. In this example, system 830 includes scanning subsystem 831 and scanning subsystem 841 that each output multiple beams. In this example, one laser beam or possibly multiple laser beams may be aimed onto scanning mirror 832 and then to a rotating polygonal mirror 834. Accordingly, in some embodiments, beam 835a, beam 835b, beam 835c may scan over object 810 at different locations.

Accordingly, in this example, spot 836a, spot 836b, and spot 836c may be considered to trace trajectory 837a, trajectory 837b, trajectory 837c respectively across the object and scene. In some embodiments, scanning subsystem 841 may similarly scan spot 846a, spot 846b, and spot 846c along trajectory 837a, trajectory 837b, and trajectory 837c. Accordingly, in some embodiments, with sufficient speed, scanning systems may cover the entire scanned scene with varying trajectories hundreds or thousands of times per second.

Figure 8C:
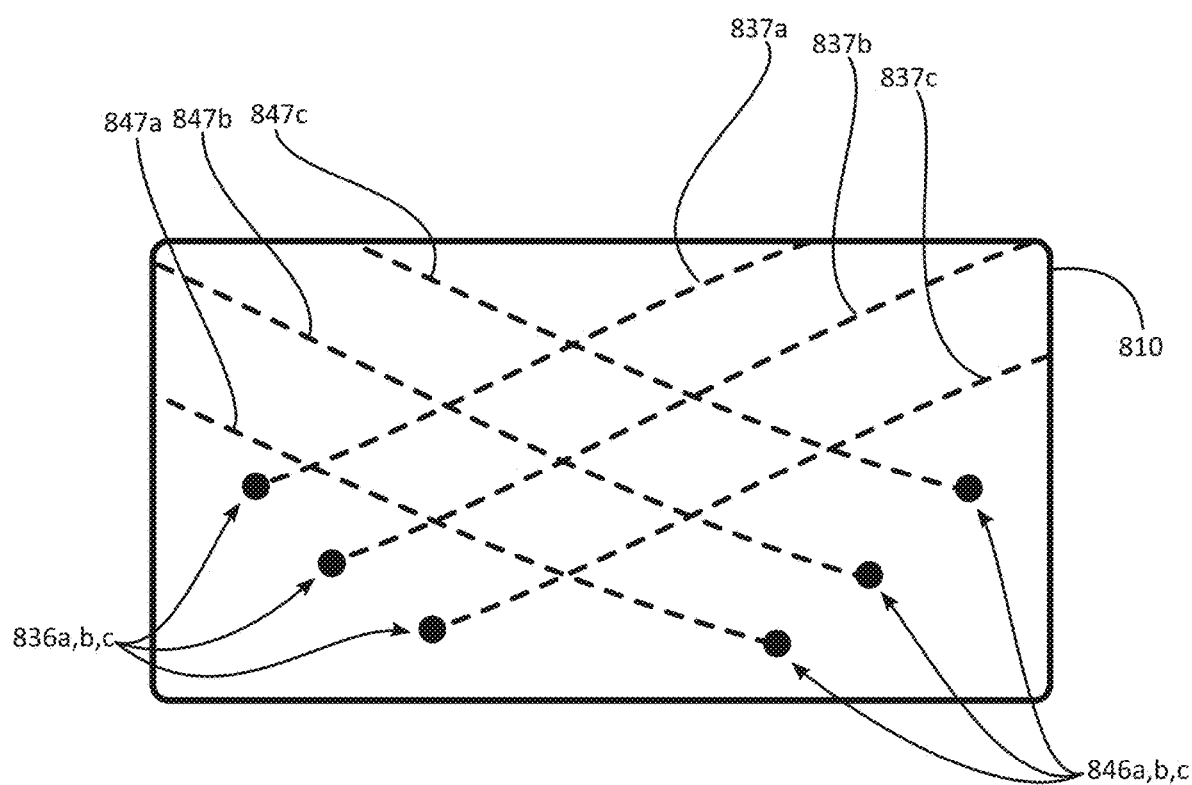
FIG. 8C illustrates a logical representation of a close-up view of a portion of FIG. 8B.

FIG. 8C illustrates a logical representation of a close-up view of a portion of FIG. 8B. For clarity in the following discussion, FIG. 8C illustrates a close-up view of object 810 with associated points and scan traces as seen in FIG. 8B. Note that the scan traces are depicted as dotted lines for clarity, but represent the trajectory of a continuous beam in most cases.

Figure 9:
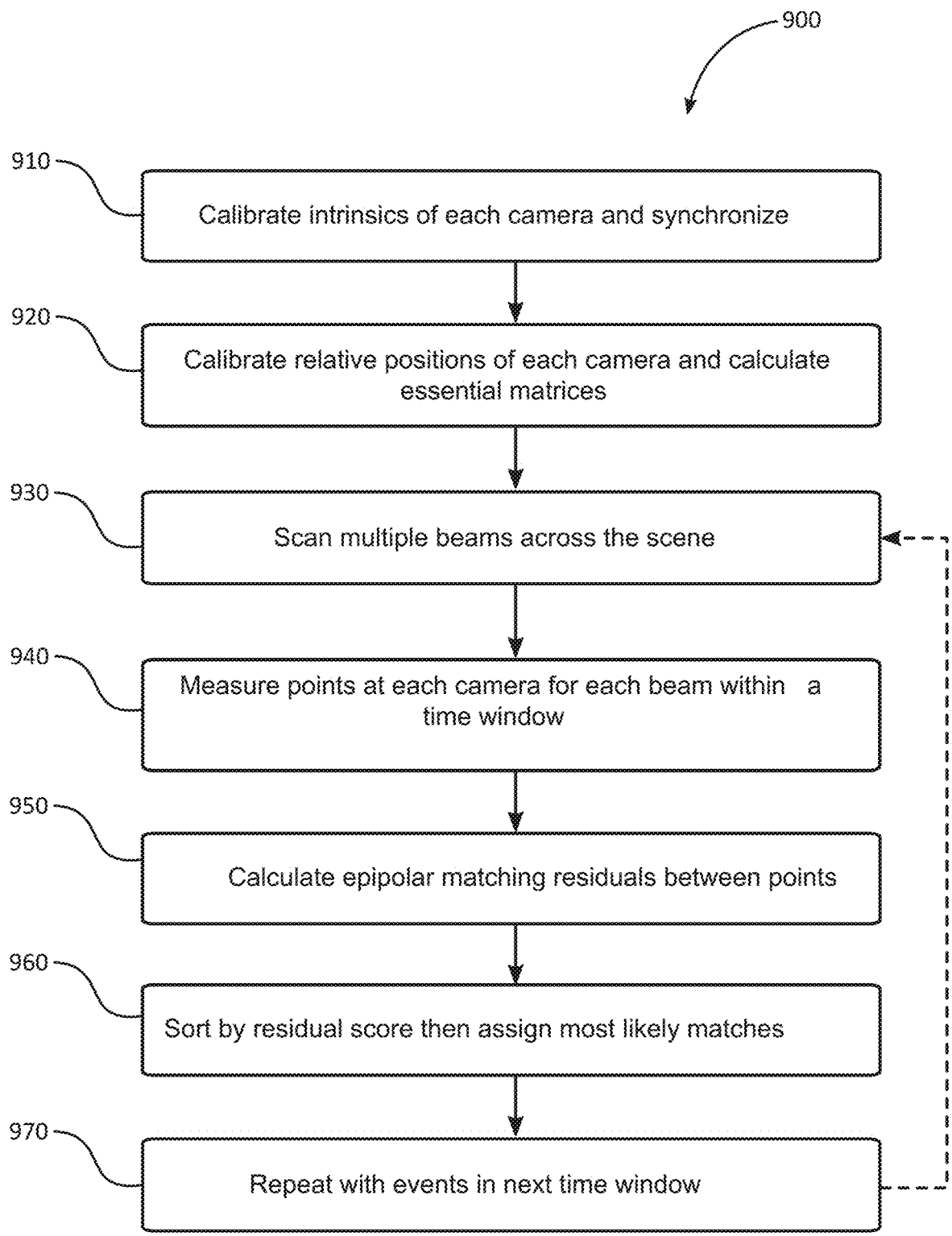
FIG. 9 illustrates a flowchart of a process for identifying points from multiple beams scanning across a scene in accordance with one or more of the various embodiments.

FIG. 9 illustrates a flowchart of process 900 for identifying points from multiple beams scanning across a scene in accordance with one or more of the various embodiments.

In some embodiments, process 900 may include calibration of the cameras of the system. In some embodiments, calibration may include various actions depending on the configuration of the system.

At step 910, in one or more of the various embodiments, the intrinsic parameters of event cameras may be measured or calculated using a variety of known or conventional methods suitable for the particular system, application, or system components. In some embodiments, event cameras may be configured based on the intrinsic parameters, such that (x, y) points detected by a sensor may be converted into a calibrated homogenous point at the image plane for that camera.

In some embodiments, many of the intrinsic parameters may be linear while one or more other nonlinear effects such as lens distortion may be handled differently. In some embodiments, each point measured may be converted using distortion and other calibration parameters individually for each camera in the system. In addition, the time base for each camera may be synchronized with each other; since events from event cameras may be reported with a sensor array position and a timestamp, the timestamps among the different cameras in a scanning system may be synchronized. In some embodiments, time synchronization may be accomplished by a variety of methods, such as, using one camera to provide a base camera clock to synchronize the timestamps/time signal among the various cameras.

At step 920, in one or more of the various embodiments, the event cameras in the scanning system may calibrated relative to each other or the scanning environment/application. In some embodiments, using various methods, the positions of the cameras may be measured with respect to each other. For example, if camera 801 is chosen as the base camera, then cameras 803 and 805 may be measured carefully to determine the translation and rotation of the cameras with respect to camera 801.

In one or more of the various embodiments, the essential matrix E between two calibrated cameras in the scanning system may be calculated as $$E = R(t)_x$$

where R is the 3×3 rotation matrix between the imaging axes of the two cameras, and $(t)_x$ is the skew-symmetric form of the translation vector, that is the linear translation between the two cameras. The essential matrix may then be calculated on a pairwise basis between each set of two cameras. Note that calibration between any two cameras may be accurate to a scale factor, but if any particular measurement is known about the system, then the entire system as well as 3-D measurements of the system will be correct in world coordinates as well.

The essential matrix follows the epipolar constraint, which may be described as $$(x_1)^T E(x_2) = 0$$

where $x_1$ and $x_2$ are the homogenous coordinates of an image point in each camera space, and effectively states that the two points imaging a single world point in each camera lie in the epipolar plane of the two cameras.

In some embodiments, if the essential matrix is known for the current position of any pair of cameras, it may be used to determine if two points measured in different cameras were measured from the same world point. If two points measured at different cameras correspond to the same world point is 3D space, they may be said to match. For example, FIG. 8C shows six different points. If $x_1$ is set to point 836a in camera 801 and $x_2$ is defined as point 836a in camera 803, then Eq. (2) should hold, that is the product of the point vectors and essential matrix should be at or close to zero, and the points match. But if instead $x_2$ was defined as point 846a in camera 2 keeping $x_1$ the same point 836a in camera 801, the result would be non-zero, and the points would be non-matching.

However, in some embodiments, it may be difficult to conventionally satisfy the epipolar constraint because of noise or other local circumstances. Also, in some embodiments, event camera pixels may normally trigger if light levels change sufficiently at the pixel to trigger an event. Accordingly, in some embodiments, pixels may be triggered as the beam scans across it. Though, in some cases, for some embodiments, there may be uncertainty as to the exact position of the beam at a particular time depending on one or more factors, such as, the size of the spot of the beam as imaged at the pixel, the position of the beam relative to the center of the pixel, and pixel time jitter, or the like. Thus, in some embodiments, the epipolar condition may be slightly off in general because exact simultaneity of each point may not be guaranteed. However, in some embodiments, points that may not match between any two camera views may be expected to be far away from matching. Accordingly, in some embodiments, if sensed points at different cameras do not correspond to the same real world point, they may result in error scores that may be significant. For example, the residual, r, may be calculated for two points in different cameras by $$(x_1)^T E(x_2) = r$$

Accordingly, if r may be less than a tolerance value, the two points may be considered to match. In some embodiments, the tolerance value may be chosen experimentally both to minimize false matches and minimize noise affecting true matches, but this should be possible in most cases as the residuals between matching points and non-matching points may be orders of magnitude in difference. Accordingly, in some embodiments, residual threshold values may be determined from configuration information to account for local requirements or local circumstances.

In one or more of the various embodiments, step 910 and step 920 may be combined by using the fundamental matrix between two cameras rather than the essential matrix. The fundamental matrix also has an almost identical epipolar constraint, replacing F for E in the formulas above. However, the fundamental matrix representation includes the intrinsic calibration data of each camera as well.

In step 930, in one or more of the various embodiments, two or more beams may be scanned across the scene including the one or more objects that may be present. Scanning may often be a continuous process with various scanning patterns. In one embodiment, rather than continuous scanning, the scene may be flashed with a multitude of points, perhaps created by diffractive elements on a laser or through other means such as modulating many laser beams together. These points may be captured within a time window of the next step and analyzed in a similar manner in subsequent steps.

In step 940, in one or more of the various embodiments, events may be measured within a certain time window. The time window may be determined such that there is enough time to capture events triggered by light reflecting from each beam in all of the cameras, yet not so long as to trigger many continuing events as the beams scan across the objects in the scene. Accordingly, in some embodiments, the particular time window (time window duration) may be determined based on configuration information to account for local circumstances or local requirements associated with the instance scanning application.

In some embodiments, if multiple events within the window trigger within a close distance at an event sensor within the time window, they may be averaged to obtain a centroid, or some other method to obtain the best (x, y) coordinate to use for the point as imaged. Ideally, each scanned beam would produce one measured point at each camera during the time window, but fewer may be measured since beams may be scanning over other objects, including the background of the scene, which may or may not be within a close enough distance to be detectable by the cameras. In some embodiments, the time length of the window may vary based on a number of factors, such as, the time resolution of the event cameras, the scanning speed of the beams across the objects, the image plane of the cameras, or the like. For example, in some embodiments, if the time resolution of the cameras is 1 µs, the time window for processing events to measure points may be as small as 1 us. Also, for example, in some embodiments, if the scanning speed across the object may be much slower than the resolution, it may affect the event window. Experimentation may need to be done to determine how to obtain sufficient point results without missing distinct points within that time interval. Accordingly, in some embodiments, time windows may be determined based on configuration information to account for local circumstances or local requirements.

In step 950, in one or more of the various embodiments, the epipolar matching residual may be calculated between each set of two points belonging to different cameras. In some embodiments, the calculation may be done between all sets of possible points, or in a variant, only some of the pairs of points may be chosen which have the highest likelihood of matching. The list of correspondences and residuals may be sorted based on the residual value, and scored such that the pairs of points with the lowest residual values may be the most likely to be matched points. This list of correspondences may be done similarly for each pair of cameras using the particular essential matrix calculated for that pair. For example, in some embodiments, on cameras 801 and 803, the pair of points with the best matching criteria might be measured from point 846a, for now denoted as $p_{101}$ and $p_{103}$. These two candidate image points can then be removed from the list of correspondences with other points. Similarly, the same point 846a imaged on camera 805 should also have a list of correspondences between pairs of points, and it is likely that if there is a point $p_{105}$ with a low residual score between it and either $p_{101}$ or $p_{103}$ or both. If this is the case, then it is very likely that all three image points were indeed imaged from the same scanned point. In the same way, imaged points may be removed from the list until the remainders are associated with matches or are determined not to have a suitable match with a residual lower than the tolerance value chosen. Accordingly, in some embodiments, in some cases, one or more points may have no matches at all. Thus, in some embodiments, such points may be considered to have been captured by one camera, or else the point captured at that camera was actually a noise-triggered event on just that camera, and not an object point. In some embodiments, matched points may be used for triangulation to calculate 3D object positions or for other purposes.

In step 970, in one or more of the various embodiments, process 900 may be repeated with a new set of points in the scan back at step 930. Accordingly, in some embodiments, each step may be repeated for each set of point captures, as geometry of the scanning process is not taken into account. Note that portions of process 900 may be considered to be continuous. In general, the scanning of surface may be continuous, and events may be generated at each of the cameras while the reflected light may be imaged by the event cameras. Thus, in some embodiments, analysis of events captured starting in step 940 may continue as new events continue to be generated by the scanning beams. Analysis may be faster than the scanning time, in which case 3D points generated by the matching may be obtained in near real-time. However, in an embodiment, many scans with data capture of events might be acquired by the system first, and then offline processing may match the points in later steps.

Figure 10A:
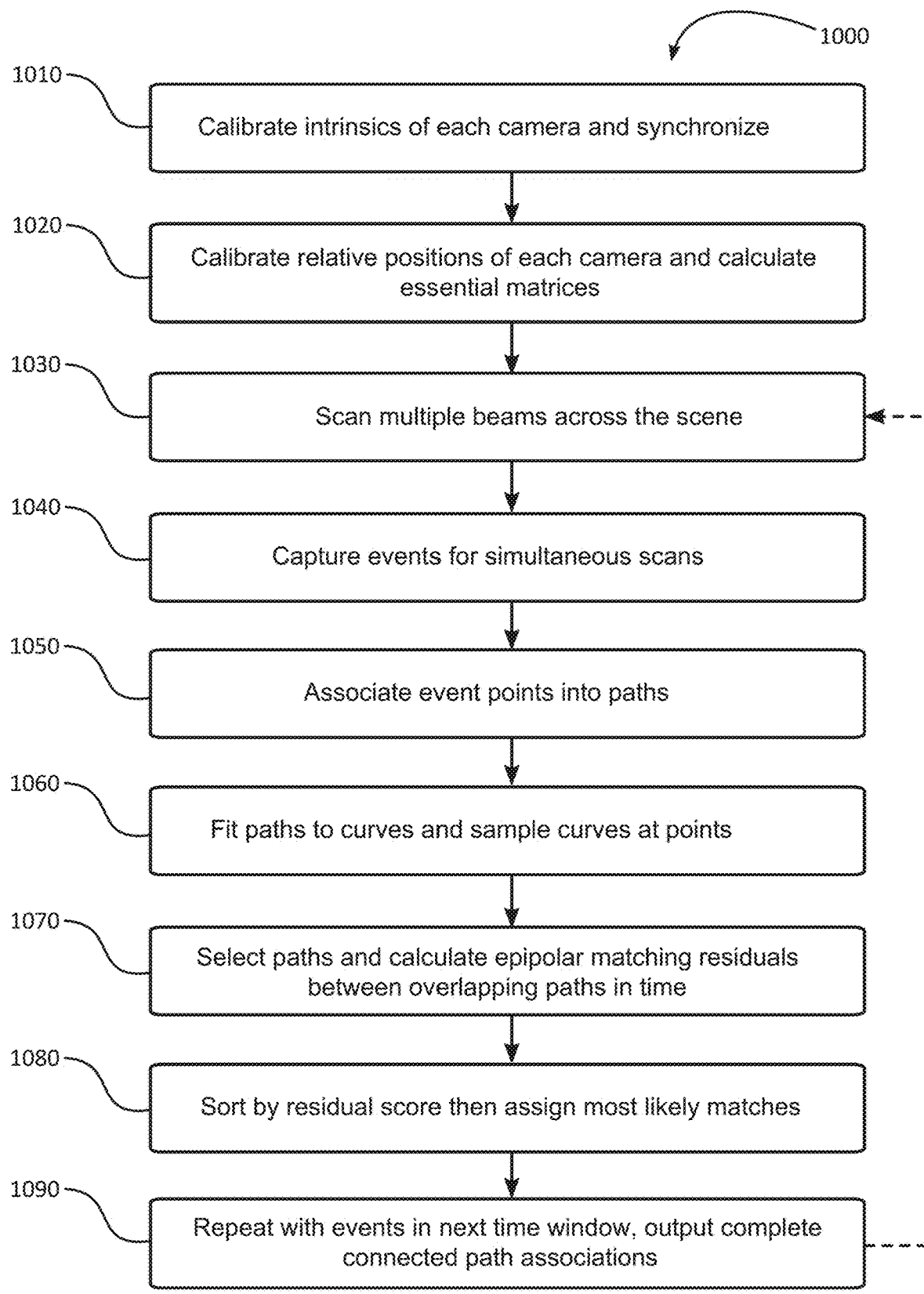
FIG. 10A illustrates a flowchart of a process for identifying trajectories from multiple beams scanning across a scene in accordance with one or more of the various embodiments.
Figure 10B:
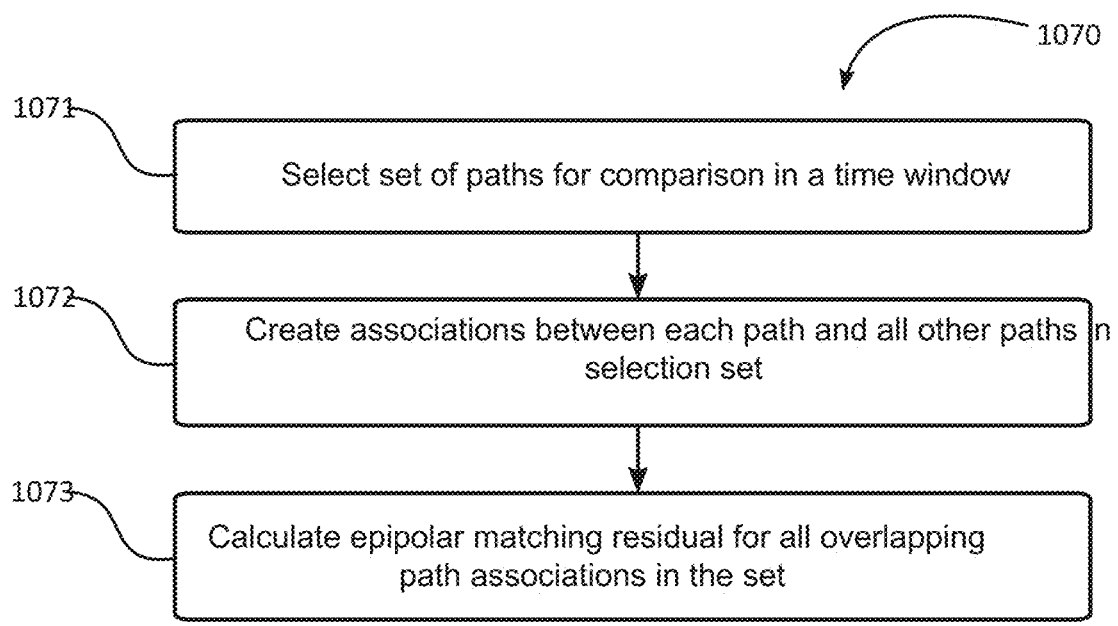
FIG. 10B illustrates a flowchart of a process for a sub-process of the method illustrated in FIG. 10A in accordance with one or more of the various embodiments.
Figure 10C:
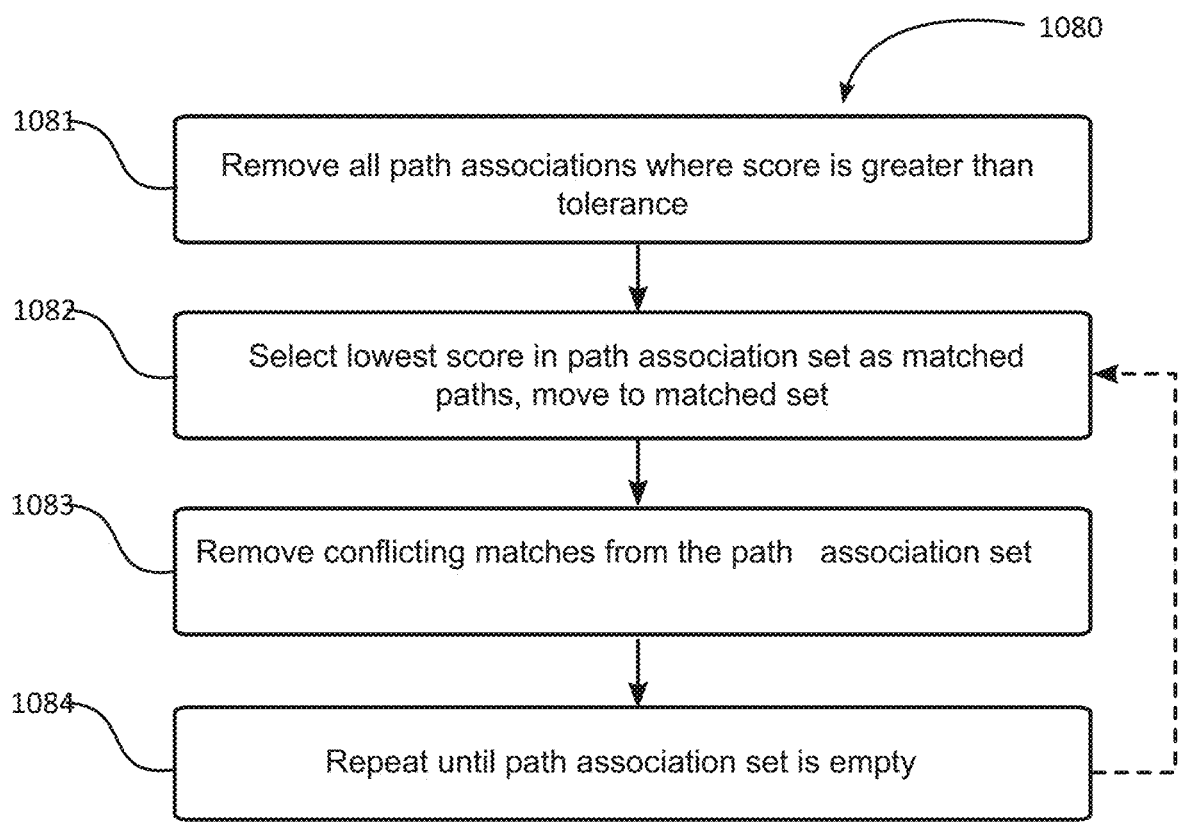
FIG. 10C illustrates a flowchart of a process for a sub-process of the method illustrated in FIG. 10A in accordance with one or more of the various embodiments.

FIG. 10A illustrates a flowchart of a process for identifying trajectories from multiple beams scanning across a scene in accordance with one or more of the various embodiments. FIG. 10B illustrates a flowchart of a process for a subprocess of the process illustrated in FIG. 10A in accordance with one or more of the various embodiments. FIG. 10C illustrates a flowchart of a process for a subprocess of the process illustrated in FIG. 10A in accordance with one or more of the various embodiments.

In process 1000, additional information may be obtained by treating the event points captured as connected data points and by assigning these points to connected trajectories. Accordingly, in one or more of the various embodiments, rather than attempting to match individual points, process 1000 may match trajectories with one another.

Referring to FIG. 8C, laser beam spot 836a may be triggering events in each event camera that may observe that point, but the laser beam has traced out trajectory 837a across object 810. Events would have already been generated with image points that approximate the trajectory of the laser. Because for each beam scanning the scene, the point may be scanned continuously, as the beam follows the trajectory it will generate events in each event camera that are both near in space as well as near in time if it may be crossing the same object. Thus, in some embodiments, points may be associated with one another into trajectories, which in many cases one or more portions of which may be seen in all event cameras.

In one or more of the various embodiments, step 1010, step 1020, or step 1030 may be similar to step 910, step 920, or step 930 of process 900 described above. Accordingly, in some embodiments, the event camera configuration or calibration may be substantially the same, and the scanning of more than one beam across the scene may be similar as well, though the scan patterns may be optimized for capture of scanned trajectories.

Figure 11A:
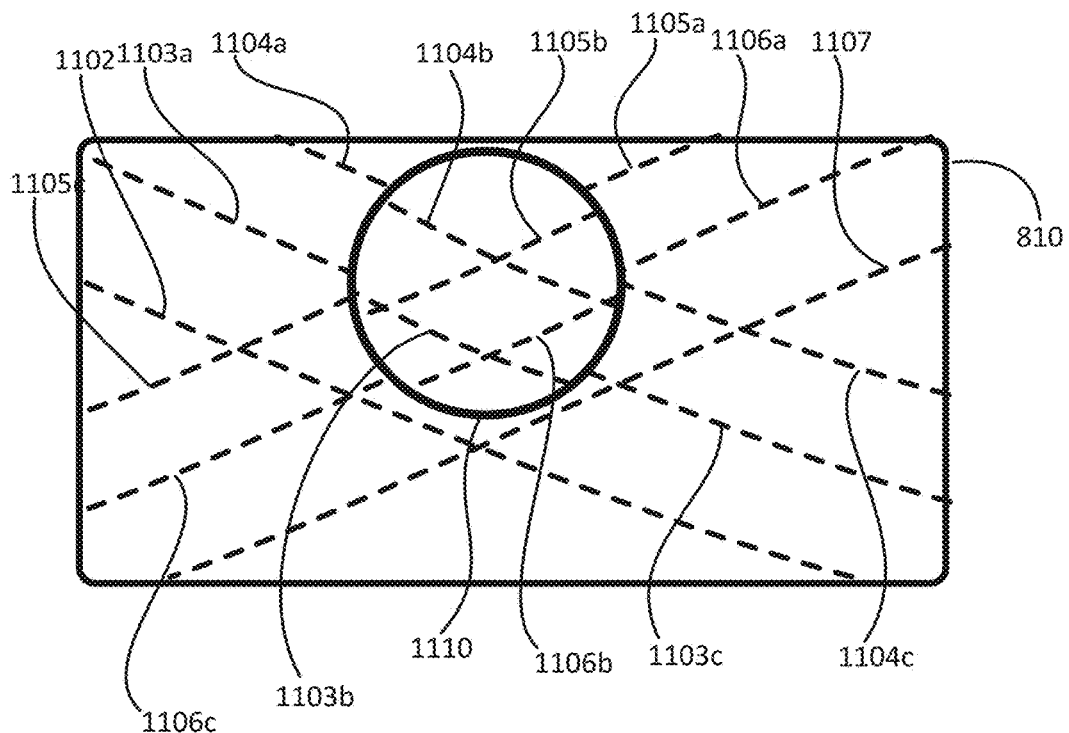
FIG. 11A illustrates a logical representation of a close-up view of two objects being scanned by a multiple beam scanning system in accordance with one or more of the various embodiments.

In step 1040, in one or more of the various embodiments, events may be captured as the beams cross the scene, but no explicit time window may be used to delineate points. Instead, in some embodiments, the event points may be first associated into trajectories. Each trajectory may be a portion of the scan line as it intersects a particular object. One example of this may be seen in FIG. 11A, which shows a close-up view of a scene more likely to be captured by the system. In this example, sphere 1110 may be placed in front of flat object 810, and the scene may be scanned by a system such as system 830.

Figure 11B:
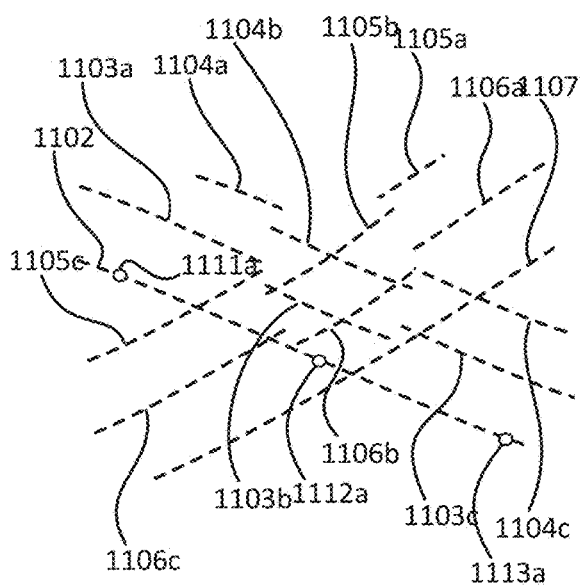
FIGS. 11B and 11C illustrates a logical representation of the scanned trajectories of beams scanning across two objects from the perspective of two different cameras in accordance with one or more of the various embodiments.
Figure 11C:
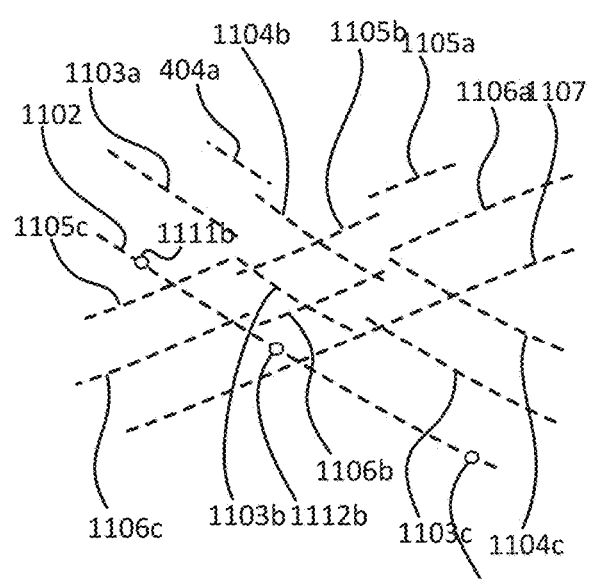

In this example, for some embodiments, six scanned beams may be crossing the scene. The scanned beam trajectories may also continue past the outer edges of object 810, but unless the background may be close enough to the cameras and may be in their fields of view, no reflected points will be detected by the system. In this example, ignoring the background, the six beam scanned trajectories may be broken up into a number of measured trajectories by their intersections with the objects. For instance, beam trajectory intersects the flat object 801 over trajectory 1104a, jumps to scanning across the surface of the sphere in 1104b, and then returns to the flat object in 1104c. Similar results may be shown for other scan beam trajectories. Some beam trajectories such as 1102 only intersect the flat object 810 and thus may be never broken apart. FIGS. 11B and 11C show for some embodiments how the scanned trajectories may be seen in the image space of two different cameras, such as camera 801 and camera 805. Accordingly, in some embodiments, object 810 and object 1110 may be not detected directly by the cameras for the most part; instead they only see the reflections scattered from the surface of the objects. Each distinct line represents a different detected trajectory. In some cases, for some embodiments, at the edges of objects situated at different depths from the cameras, there may exist a spatial discontinuity between events triggered by the scanned beam, though there may be not a temporal discontinuity. These may be then treated separately by the system when seeking to match up trajectories with one another. Accordingly, in some embodiments, each scanned beam may create from zero to many distinct trajectories depending on how it intersects with the objects in the scene as well as the shape of the objects themselves.

In step 1050, in one or more of the various embodiments, event points may be associated with each other to form trajectories. The set of trajectories may be generated on a per camera basis. As mentioned before, event points that may be near in both space and time on the camera image sensor may be trajectory candidates. If a second event on the same camera may be smaller than a certain spatial distance in its coordinate system, and the time difference may be also smaller than an arbitrary time, then the second event may be likely on the same trajectory as the first event, so the data for this event may be assigned to that trajectory. This simplified process may capture most of the relevant data points and assign them to trajectories while rejecting noise-triggered events, but more complicated methods may improve this. For example, in some embodiments, Kalman filters or similar methods may be used to infer/predict the trajectory of the beam in the image space, and this could be used as an additional criterion for whether an event point belongs to a particular trajectory.

In step 1060, in one or more of the various embodiments, trajectories may be fit to functional curves according to each event in the trajectory's (x, y, t) coordinates. This may be done in the image sensor array coordinates or in homogenous coordinates for the camera. Curves to be fit may be splines or some other piecewise continuous function. Also, in some embodiments, numerical tables may be used with interpolation. Smooth curves over the length of the trajectory may be useful as well to achieve the best match with the beam scan trajectory, but may be not strictly necessary. Because there may be typically many events per trajectory, much of the noisiness of point spatial position may be eliminated. In addition, as each point in the curve also has a timestamp associated with it, the function may be time-parameterized. Points may then be sampled off the curve such that each sampled point may have an associated (x, y, t) position. Because the curve has been created from many points, the sampled points may have spatial resolution that may be below one pixel on the camera, as well as having time resolution (and accuracy) faster than the time resolution of the camera as well.

In step 1070, in one or more of the various embodiments, the trajectories may be checked for the epipolar matching condition. This step may be broken out in FIG. 10B. Accordingly, in substep 1071, in some embodiments, trajectories may be selected for comparison, possibly having a maximum time window, but instead this selection may be open-ended and all trajectories that may be not matched already may be sent to a comparison engine.

In substep 1072, in one or more of the various embodiments, every two separate trajectories may be checked for overlap with each other. This association may be done greedily, where every trajectory may be compared to every other trajectory. In some embodiments, the check may be to ensure that the two trajectories may be from different cameras. Next, the time ranges of the two trajectories may be compared to see if they may be overlapping; they may be non-overlapping if the start time of any one of the two trajectories may be after the end time of the other. The start and end times of a trajectory refer to the earliest time-stamped event and the latest timestamped event respectively. In either of these cases, the trajectories cannot be matching, and their score may be assigned to be infinity or some other large constant.

In substep 1073, in one or more of the various embodiments, the trajectories from different cameras with non-zero overlapping times may be used to calculate an epipolar residual R. R may be calculated similarly as described for process 900 above, however in this case, the points sampled from the trajectories may be used for the epipolar comparison, and though only one point might be used, typically more than one point may be selected for comparison from each trajectory. If multiple points may be chosen to calculate epipolar residuals, there may be a more useful result obtained if the points may be spread out along the curve rather than bunched up in one section, such as near the beginning, middle, and end of the overlap. Generally, the process may be to find the time overlap between points on the curve, and then select points in time spaced out along that interval. In some embodiments, if the timestamp points may be chosen, they may be used as parameters for the curve fit functions for each trajectory on each camera. Ultimately the result will be multiple (x, y) points in the homogenous camera space for each of the points on the curve during the overlap time. In a particular embodiment, only two points might be used to calculate the residuals for a trajectory, those of the start and end points. In some embodiments, these could be extracted from the fit curve, but alternatively, step 1060 could be skipped for this variant and the endpoints used directly.

For example, trajectories may be labeled as 1102 on both FIG. 11B and FIG. 11C, and may be labeled the same to illustrate that they were created by the same scan of the laser beam on the object, but at this point of the process, the system has not determined that these trajectories may be matching to each other. The captured trajectories in this example may have start and end times that may be close to one another, but this is not required for this process. In this example, three times, such as, t1, t2, t3, may be chosen along the length of the overlap time. When input into the time parameterized fitting function for each trajectory on each camera, they will output points such as point 1111*a*, point 1111*b*, point 1112*a*, point 1112*b*, point 1113*a*, point 1113*b*. Each pair (e.g., point 1111*a* and point 1111*b*) may be created using the same timestamp value. Since the cameras may be well synchronized, these points may correlate well to the position of the laser as it was captured at exactly that timestamp on both cameras. Note that there may be no actual events on either camera that correspond to this particular position; nothing requires the points chosen to match any events in the camera, but nevertheless, because the points may be sampled from fitted curves, they may be accurate to subpixel resolution to where the laser spot would have been detected at that time instant. Each candidate point pair residual may be then calculated as described above. In this case, that would correspond to $$r_i = (x_{ai})^T E_{ab}(x_{bi})$$

where $x_{ai}$ may be the ith point selected from the trajectory of camera a, and $x_{bi}$ may be the ith point selected from camera b, in this example cameras 801 and 805 and $E_{ab}$ may be the essential matrix between cameras a and b. The residuals may be summed in several different ways; two of which may be using the sums of absolute values or sums of squares as shown below:

$$R = \frac{1}{N}\sum_{i=1}^{N}|r_i| = \frac{1}{N}\sum_{i=1}^{N}|(x_{ai})^T E_{ab}(x_{bi})|$$

$$R = \frac{1}{N}\sum_{i=1}^{N}r_i^2 = \frac{1}{N}\sum_{i=1}^{N}[(x_{ai})^T E_{ab}(x_{bi})]^2$$

In some embodiments, other ways of determining residuals may be used as well. N may be the number of points selected for each trajectory matching calculation. If N may be the same number for each comparison over the entire system, the initial 1/N term may be omitted as the residual scores may be relative. Residual scores for matching trajectories should be more distinguishable from non-matching trajectories as compared to the point matching process 900. Since many more events may be averaged to create the trajectory data and it may be all used to generate sampled points, it may be likely that residuals will be smaller in general. In addition, because in some cases multiple points may be compared together on a trajectory that each should largely satisfy the epipolar constraint, many degenerate conditions may be avoided that, though rare, may appear to calculate a small epipolar residual even though the points may be non-matching; this may happen since a point on one camera may be satisfied by an epipolar line on the second camera. In a variant, the fundamental matrix could be used in the preceding equations for this part of the process rather than the essential matrix.

Figure 11D:
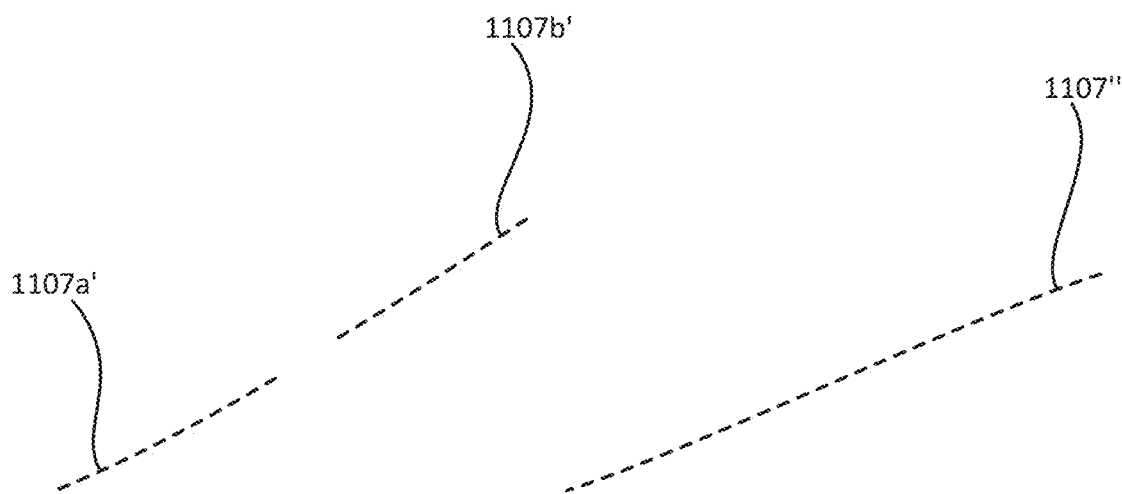
FIG. 11D illustrates a logical representation of an illustration of a single trajectory captured differently from the perspective of two different cameras in accordance with one or more of the various embodiments.

As was previously mentioned, it may be not required for the start and end times of two different trajectories to be the same for them to be compared and possibly matched. In some cases, two trajectories may be captured from different beams at the same time. Since beams scanning the scene may have no particular time correlation in how they span the scene, it may be unlikely that non-matching trajectory would have close time overlap with each other. In another case, it may be not uncommon for camera timestamp arbiters to have occasional glitches that cause the camera to not report out some events. In that case, a trajectory in one camera may appear broken up into two separate trajectories, where the trajectory may be unbroken in the second camera. This condition may still lead to matched trajectories. This may be illustrated by looking at FIG. 11D. If beam scanned trajectory 1107 had a discontinuity in the center on camera 801 in FIG. 11B, but was unbroken in the corresponding trajectory on camera 805 in FIG. 11C, then there would be two separate trajectories generated from beam trajectory 1107 on camera 801, here shown as 1107*a*' and 1107*b*', but only one trajectory generated from beam trajectory 1102 on camera 805, shown as 1107". Still, since the process compares all trajectories to each other, each trajectory section would be associated with each other trajectory and scored. Trajectories 1107*a*' and 1107" will be compared to each other over the time range of trajectory 1107*a*' and found to be a match. Similarly, trajectories 1107*b*' and 1107" may also be compared to each other and found to match as well. All three of these trajectories may form a connected trajectory association, as they all come from the same beam scan over the same object in the scene. This will not generally be true when there may be discontinuities based on the beam scanning to a different object in the scene. One example of this in FIG. 11A may be trajectories created by the beam scanning 1103*a*, 1103*b*, and 1103*c*. Because the individual trajectories at the object position may be at different positions in 3D space, they may not satisfy the epipolar constraint and thus will not be matched or associated together. Although, trajectories created from 1103*a* and 1103*c* may be from the same beam scan and may be over the same surface, nevertheless they will not be matched into a trajectory association using this process.

In another embodiment, if the number of trajectories to be compared may be too large to be efficiently computable, a subset of these trajectories may be chosen, based on time range or camera source of the trajectory. For example, each camera could send its set of trajectories separately to a comparison engine, and then they would only be compared to trajectories from a different camera. These would be selected in substep 1071 and then compared separately in substep 1073.

Returning back to FIG. 10A, in step 1080, in one or more of the various embodiments, trajectory matches may be assigned based on score. This may be broken out in FIG. 10C. First in substep 1081, the set of possible matches may be reduced in size by removing all trajectory associations where the score may be greater than a tolerance value (including all the non-matches scored infinity). In some embodiments, the tolerance value may be experimentally chosen to remove false positives but still allowing for somewhat noisy data to still create matches. Accordingly, in some embodiments, tolerance values may be determined from configuration information to account for local requirements or local circumstances.

In one or more of the various embodiments, an empty set of matched trajectories may be created. In substep 1082, sensing engines may be arranged to iterate over the remaining set of trajectory associations which may be all possible matches. The lowest score from the trajectory association set may be chosen and the trajectory association (denoted as 'm') may be moved to the matched set. In substep 1083, all conflicting trajectory matches to 'm' may be removed from the trajectory association set. Two potential trajectory matches may be conflicting if all the following conditions may be met: they have a trajectory in common, they connect the same two cameras, and they have non-zero time overlap. Simply put, the two trajectories in 'm' have the best match to each other as compared to other trajectories. If another trajectory 'p' different than either of the trajectories in 'm' has a higher score (and thus a higher residual epipolar error), then that trajectory may be not a match to either trajectory in 'm' if trajectory 'p' has any time overlap with the matched trajectories 'm'. Thus, in some embodiments, these potential matches may conflict with the better match 'm' and may be removed as possibilities. In substep 1084, this process may be iterated until the trajectory association set may be empty, and the set of matched trajectories may be returned.

In some embodiments, data from multiple cameras may be taken into account and correlated. For example, in some embodiments, if trajectory 1 from camera 1 was matched with trajectory 2 from camera 2, and also trajectory 2 may be matched with trajectory 3 from camera 3, then one would expect that trajectory 1 and trajectory 3 would also show up as matched trajectories as well. If this may be not the case, there may be an error in relative scores at some component, and the matching sets may be correct. This type of error may be rare however, since epipolar matching of a curve at several points may be likely to be quite discriminatory. Accordingly, in some embodiments, comparison engines may be arranged to employ one or more rules, instructions, heuristics, or the like, from configuration information to include in comparison operations to account for local requirements or local circumstances.

In step 1090, in one or more of the various embodiments, the process may be iterated with the next set of trajectories. In one or more of the various embodiments, the set of matched trajectories may be stitched together to form connected components where there may be overlap of one or more trajectories continuously across a scan across the scene. If the next set of unprocessed trajectory data could possibly have matches with the current set of matched trajectories, the current set of matched trajectories may be retained in the next iteration of processing. But if the next set of data (based on knowledge of scan time across the scene) could not possibly have any matching trajectory data, then this step may output a complete connected trajectory association set.

In one or more of the various embodiments, secondary indicators may be employed to assist in matching trajectories to one another. For instance, in FIG. 8B we show as an example a system where some of the scanning beams have a geometric relationship to other beams where they could not possibly intersect with others of these trajectories of different cameras at the same time. Secondary indicators may be helpful in resolving some ambiguities, but in many cases will not be needed as the discriminatory power of sampling multiple points along the curve may be very good since the curves have accurate time data throughout. Accordingly, in some cases, there may be tens or more of uncorrelated beams scanning across an object that could still be detected and processed very quickly for matches.

In another embodiment, portions of process 1000 could be added to the point matching process 900 to improve the accuracy of matching on a quicker basis. For instance, in some embodiments, process 1000 requires that some or all of the set of beam scans be finished across the scene before the candidate trajectories may be assigned at each camera, and then matched using process 1000. Process 900 may match on a point-by-point basis, but may be much more susceptible to noise at each event point captured. However, if an arbitrary number of points may be associated within a close time and space window of a particular event, essentially calculating the equivalent of a candidate trajectory for a portion of a trajectory, then the velocity or else at least the tangent vector of the measured spot at that event point may be estimated. The tangent accuracy may be increased by expanding the window of point comparison. Once an (x, y, t) point along with its associated point tangent (or velocity) may be determined, then the (x, y, t) point-tangent pair may be compared using epipolar geometry to corresponding sets of point-tangent pairs from the other cameras. In some cases, this may provide improved accuracy in matching compared to points alone from process 900, but may be calculated more close to real-time than process 1000. Also, in some embodiments, improved accuracy may be obtained by using a look forward approach where a few points after the captured point of interest may be also used to estimate the tangent or velocity vector at that point. Points may be matched alone or else with point chunks within the window, and assembled into full trajectories as the beam scans continue.

In yet another embodiment, trajectory matching using similar methods may be accomplished using standard frame capture cameras using image sensors. Even a fast frame capture camera (which reads out the entire frame at once after capturing light over a period of time) would have very minimal timestamp data associated with it. Because the shapes of the scanned beams might change quite a bit from the perspectives of each camera, it may be difficult to match multiple simultaneous beams scanned across an object. In addition, if the frame capture window was long enough, several scans might be done across the scene by the same beam making another pass within the frame capture time; these would be indistinguishable from other scanned beams created from a different laser beam. The imaged trajectories at each camera would be captured in their entirety without time information that allows the event camera data to match many trajectories effectively.

However, in some embodiments, epipolar matching may allow a limited form of multi-beam scanning. Though there may be not any timestamp data on the trajectories, frame capture cameras often have a higher spatial resolution than event cameras. Accordingly, even though the time a beam scanned reaches the edges of an objects may be unknown, the frame capture camera may be able to resolve the discontinuity of the trajectory. Though the trajectory may not be fit and sampled as well, the two endpoints of the trajectory should obey the epipolar constraint. Continuous curves in each image may be extracted from the frame capture image through standard image processing techniques. By analyzing the endpoints of all continuous curves found, a similar matching process to process 1000 may be achieved, using the summed epipolar residuals of the endpoints of each segment to determine the best match. For greater confirmation, two potentially matching trajectories, though they have no timestamp data to examine points directly other than their endpoints could still be fit spatially to a functional curve. One or more interior points of each of the trajectories might then be checked to see if these also meet the epipolar constraint. In some embodiments, there may be fewer matches found with this method; in some cases, the frame capture may take place in the middle of one or more beam scans, and as such the endpoints would be inaccurate. In one variant, the scanning system comprises both event cameras as well as frame capture cameras. Trajectory matching between an event camera and a frame capture camera may be possible using the endpoints method. If more than one event cameras have data about scanned trajectories, this may be used to predict the position of trajectories on a calibrated frame capture camera, which now might be used for its higher resolution capabilities for this or other purposes (for instance, matching image data with scanned 3D surface data).

In one variant to this embodiment, additional data points may also be used to check for matching trajectories on frame capture cameras. Consider the illustration as shown in FIG. 8C. Trajectory 837a appears to cross over trajectory 847a, trajectory 847b, and trajectory 847c within the measurement of the frame capture. The spots of the beams may not actually cross simultaneously, however the scans may be close enough in time such that much of the set of trajectories appear on the frame capture image. The beams appear to cross at a particular point on the image of each camera. Thus, in some embodiments, if the start and endpoints of a trajectory may be unavailable, the crossing points of a particular trajectory with one or more other trajectories may be discernable. The intersection point may be determined by observation, or else portions of the trajectory may be fit to curves to determine the precise location in each homogenous camera spatial coordinates. Then, the set of crossing points calculated for each trajectory may be compared to other similar points as measured using again a similar process 1000 as before.

In some embodiments, if the endpoints may be available, they may optionally be included in the calculations as well. This may work well if the cameras frame capture time may be synchronized with the beam scanning intervals, but this may not be necessary, and potentially each camera may not need to be synchronized with each other either. In some cases, this method may be used if partial data may be available. Each crossing point that may be matched using epipolar data fixes the identity of the two trajectories that cross over at that point. For example, in FIG. 8C, if the positions of only three of the nine crossing points may be measured with a reasonable level of certainty due to noise or other interfering factors, the identities of all six trajectories may be determined if their crossings were from non-overlapping trajectories. If the number of distinct crossing points per measurement increases, it becomes statistically likely that all of the trajectories measured may be identified and matched between the cameras for each frame. In addition, having a number of verified crossing points along each trajectory improves the quality of the trajectory data for later 3D object measurement calculations.

In another embodiment, the overall trend of matched trajectories residuals may be monitored over time for calibration or other drift. In a well-calibrated system 800 such as the one shown in FIG. 8A, if all three cameras maintained their position well, then epipolar residuals from matching trajectories would tend to approach zero. This will not be achievable in general due to continuing sources of noise and other uncertainties in the cameras subsystems. However, as long as the residuals stay below a certain tolerance level, the matching should still be good. If over time, the average residual for matched trajectories tends to go up, then there is likely to be calibration drift. The most common source of this may be one or more of the cameras moving. An event camera scanning system such as this may be dynamically calibrated relatively quickly, and this has been described elsewhere.

After undergoing one iteration of process 1000, the residuals of all trajectories considered matching may be averaged together and stored with the timestamp of reported data. These averaged residuals may be stored on a per camera pair basis. In system 800, there would be three streams of averaged residual data, one for each camera pair. If the residuals remain low and consistent, unnecessary recalibration steps may be avoided.

In one variant, the epipolar residual data collected over time itself could be used to correct the calibration. For instance, if $r_{101,103}$ (residual between cameras 801 and 803) stayed relatively constant, but $r_{101,105}$ and $r_{103,105}$ were drifting slowly upwards, it may indicate that camera 805 was drifting out of position. If all three residuals may be changing over time, this might occur as the result of cameras moving slightly over time, or could be temporary movement such as vibration of relative camera positions on a moving vehicle. In this case, the situation may be more complex and a full recalibration may be needed. However, a small search could be done using the trajectory data that may be already captured by the system. First one could slightly tweak the assumed position rotation and/or translation of one of the cameras. Then the essential matrices between the cameras could be recalculated, and the residuals recalculated. If this results in an improvement, further tweaks may be made to lower the average residuals closer to their original value.

In one additional embodiment, rather than employing the epipolar constraint between every pair of cameras, we may instead use the trifocal tensor among three cameras. Similar to the epipolar constraint, the residual of a point viewed from three cameras tends toward zero (the trilinear constraint for three corresponding points).

Figure 12A:
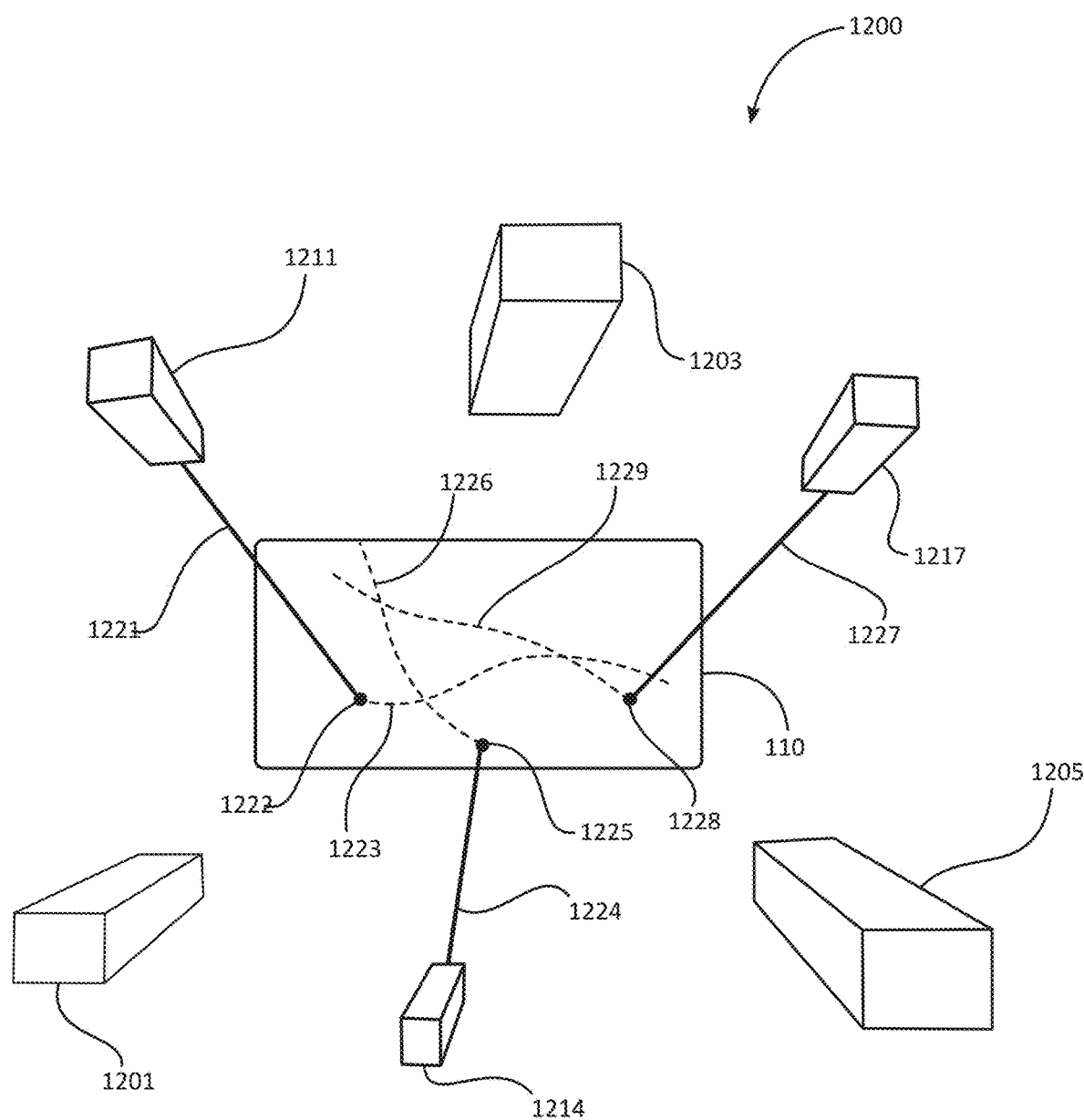
FIG. 12A illustrates a logical representation of a perspective view of another embodiment of a multiple beam scanning system in accordance with one or more of the various embodiments.
Figure 12B:
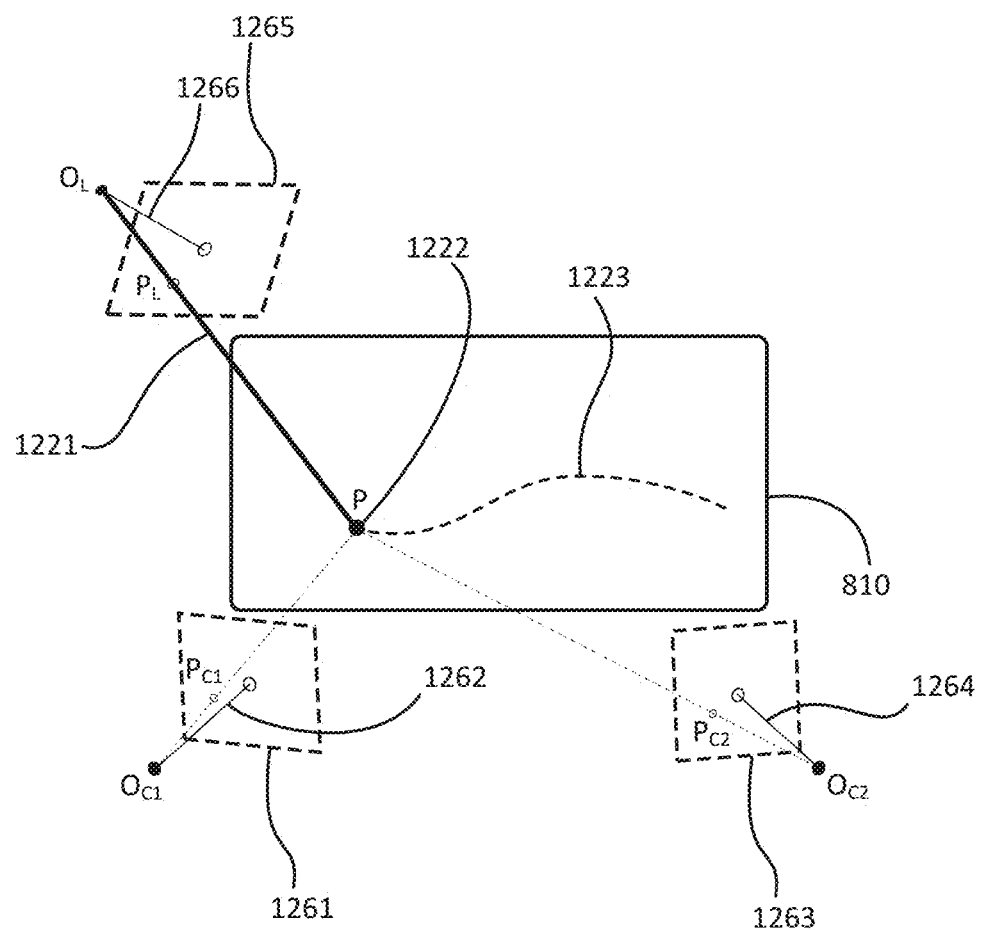
FIG. 12B illustrates a logical representation of a perspective view of diagrammatic view showing parameters of a multiple beam scanning system in accordance with one or more of the various embodiments.
Figure 12C:
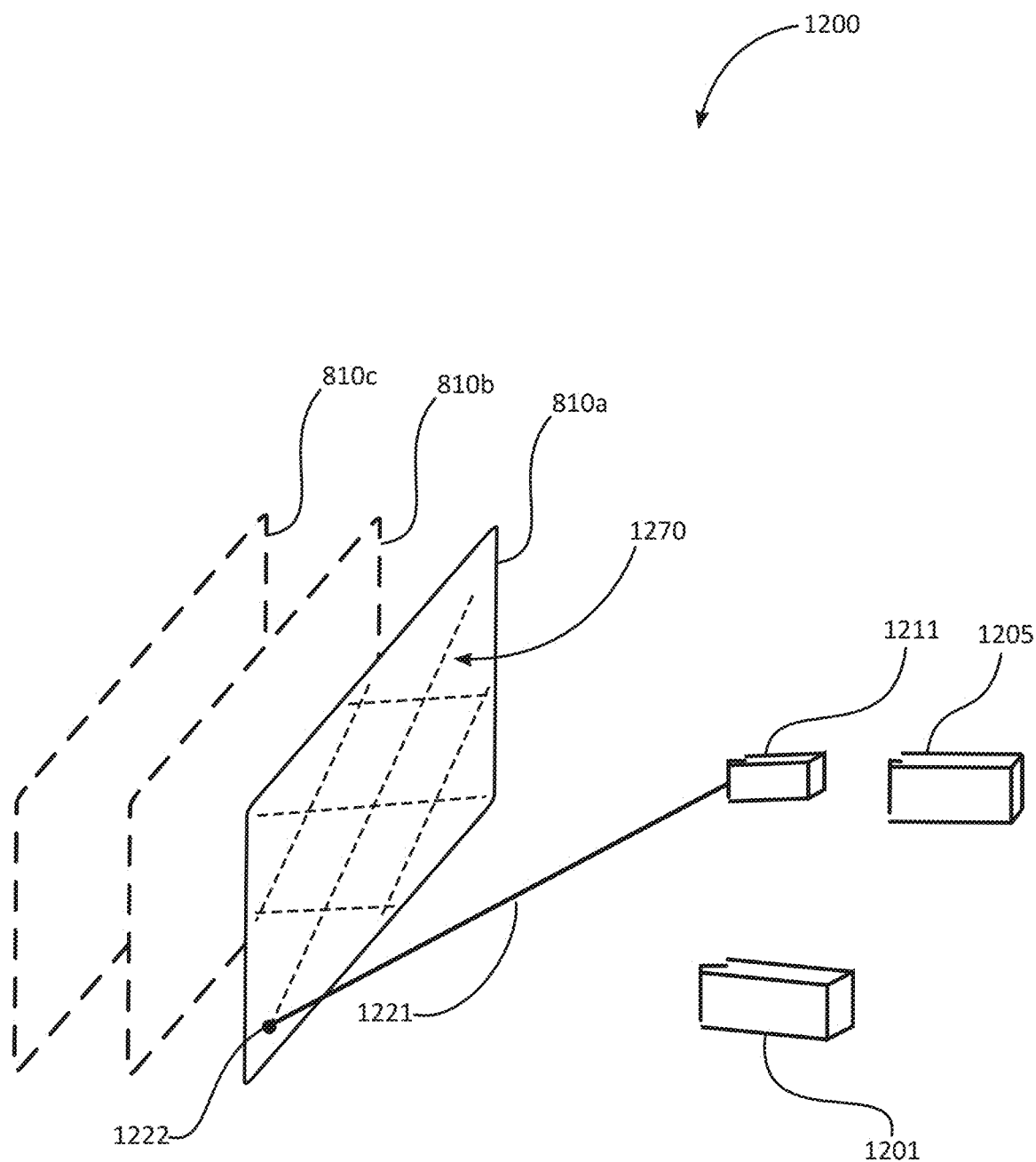
FIG. 12C illustrates a logical representation of an alternate perspective view of an embodiment of a multiple beam scanning system in accordance with one or more of the various embodiments.
Figure 12D:
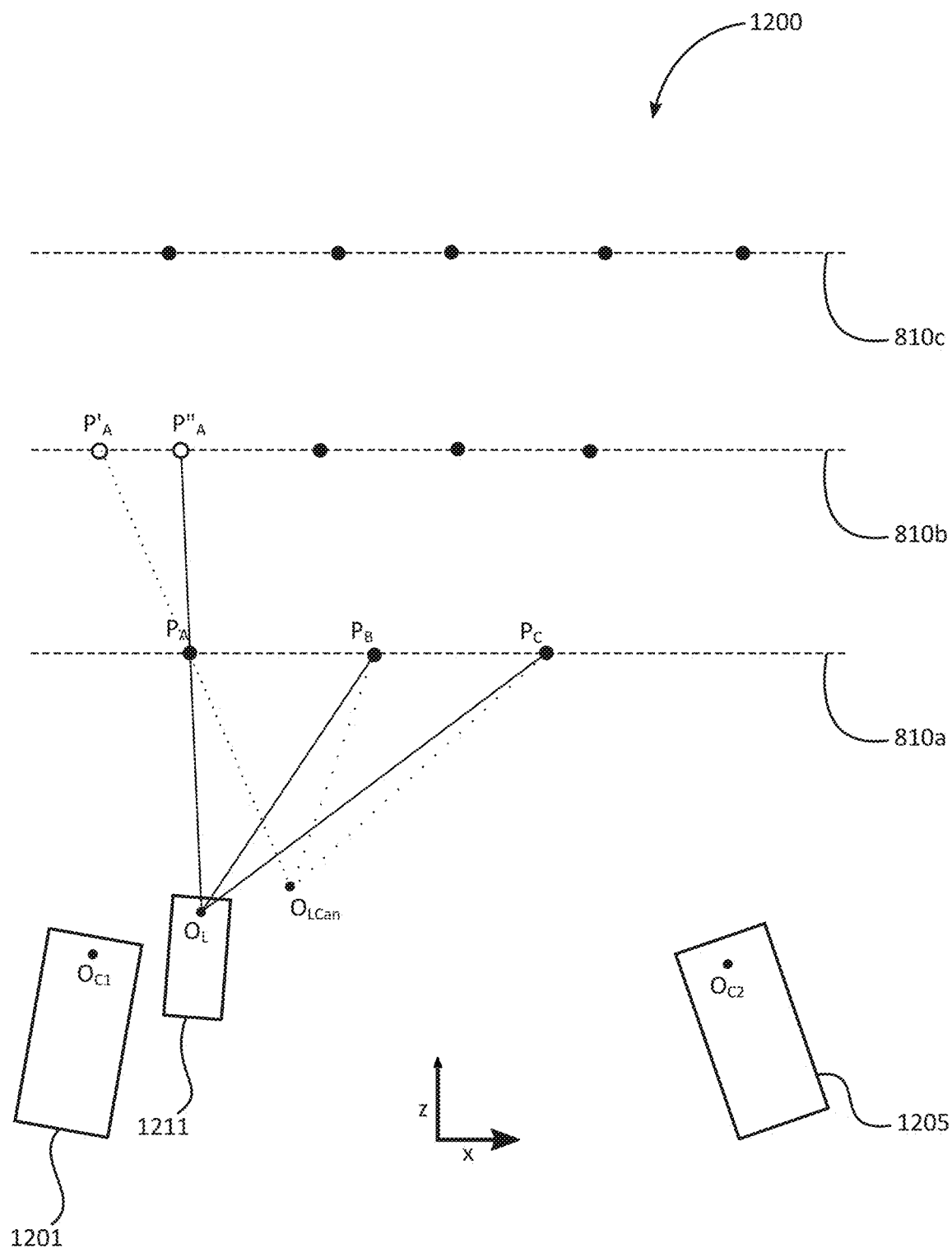
FIG. 12D illustrates a logical representation of a top view of an embodiment of a multiple beam scanning system in accordance with one or more of the various embodiments.

FIG. 12A illustrates a logical representation of a perspective view of another embodiment of a multiple beam scanning system in accordance with one or more of the various embodiments. FIG. 12B illustrates a logical representation of a perspective view of diagrammatic view showing parameters of a multiple beam scanning system in accordance with one or more of the various embodiments. FIG. 12C illustrates a logical representation of an alternate perspective view of an embodiment of a multiple beam scanning system in accordance with one or more of the various embodiments. FIG. 12D illustrates a logical representation of a top view of an embodiment of a multiple beam scanning system in accordance with one or more of the various embodiments.

In one or more of the various embodiments, information may be obtained on matching trajectories by using information from the scanning beams as well as from the cameras to match trajectories measured by the cameras with. FIG. 8A shows three cameras and two laser beams scanning across a scene. The scanning laser beam projectors as well as the cameras are all in arbitrary locations. Although it is possible that some of the elements could be lined up such that three or more of the optical centers are collinear, this is not necessary. In fact, additional disparity between all of the light sources and cameras may be advantageous, as further disparity improves the detectability of 3-D positioning from different perspectives. For instance, any of the cameras or lasers might be positioned well above the objects so that the cameras and lasers form a ring around the scene. An example of this is shown in FIG. 12A, which includes three cameras and three lasers. In this example, system 1200 depicts three cameras (event camera 1201, event camera 1203, event camera 1205) as well as three laser scanners (laser 1211, laser 1213, laser 1215). Laser 1211 has a beam 1221 at a point 1222 on object 810 that has scanned over path 1223. The other lasers have projected similar features on the object.

In this embodiment, each scanning laser such as laser 1211 may also be mathematically treated as having a virtual camera associated with it. Similar to camera 1203, laser 1211 has an optical center from which point the beam is rotated. That position may be defined as the optical center of the virtual camera. The axis of the laser direction as well as the position of the virtual camera's optical center can also be defined by an essential matrix with respect to other cameras or virtual cameras in the system. An illustration of this may be seen in FIG. 12B. Here, system 1200 is shown in simplified format at the same time as in FIG. 12A, where all of the lasers and cameras are not shown. For brevity and clarity, this discussion focuses on a single laser point as imaged by two cameras. Laser beam 1221 is still hitting the object 810 at point 1222, also denoted as point P. The image space of camera 1201, also denoted as C1 is shown using its projection plane 1261 as well as the optical axis of camera 1262. The axis is chosen to go through the center of the projected image sensor. All coordinates are in homogenous coordinate space. The optical center of C1 is point $O_C1$. Point $P_C1$ is therefore the image of point P in homogenous image coordinates of camera C1. In a similar manner, the image space of camera 1205, or C2 is shown with its projection plane 1263 and its optical axis 1264, with an optical center point $O_{C2}$ and point $P_{C2}$ is the projection of point P on camera C2. As mentioned before, because the two cameras are calibrated with respect to each other, then the epipolar constraint described above holds, i.e. $(P_{C1})^T E_{C1C2} (P_{C1})=0$, where $E_{C1C2}$ is the essential matrix between the two cameras C1 and C2.

However, in some embodiments, the same relationship may hold between the laser 1211 and each of the other two cameras if the position and rotation of the laser is known and calibrated with respect to each camera. The virtual camera associated with laser 1211, also denoted as L, is shown using its projection plane 1265 along with its optical axis 1266. Because the laser is not actually imaging, the optical axis may be chosen somewhat arbitrarily. In one embodiment, it may be convenient to measure the full field of view of scanning of the laser, and then assign the optical axis to the center of the scanning range, though other axes are possible. The point $P_L$ is the projection of the laser beam itself through the projection plane 1265. If the position of the laser is well-calibrated, such that both the translation of the optical center $O_L$ is established accurately with respect to the optical centers of the cameras, and also the rotation of the optical axis 1266 of the laser is known, then the same epipolar relationship applies between the laser and any one of the cameras. For instance, $(P_L)^T E_{LC1}(P_{C1})=0$, where $E_{LC2}$ is the essential matrix between the laser L and camera C1. A key difference here between the laser and the camera is obtaining point $P_L$ for any measurement.

For a camera, in some embodiments, this point may directly correspond through a homogenous coordinate transformation to the measurement of the point on each image sensor, but there is no corresponding measurement of the point directly on the laser. Instead, in some embodiments, this point may be inferred indirectly from measured angular positions of the laser. In this case, angular positions with respect to the laser frame of reference may be measured, so the rotational parameters used to calculate the essential matrix may be relevant; however, if the beam may be substantially circularly symmetric, then the degree of freedom of rotation around the optical axis of the laser may be somewhat arbitrary, and may be chosen to match with scanning directions, camera rotation, or other criteria. In this case, the essential matrix would be calculated using the chosen laser optical axis with respect to each camera. Another difference between the laser and a camera may be the number of effective degrees of freedom. A camera may have six degrees of freedom; three may be the world coordinates of the optical center of the camera, and three more may be its rotational degrees of freedom. A laser system may have at least eight degrees of freedom; three may be the same world coordinates of its optical center, and three may be the rotational position of the laser system housing which may be pointed in any direction or orientation, but then two more rotational axes are normally scanned of the beam or beams from the laser. If a laser system outputs more than one beam, the position of these beams around the optical axis may describe a ninth degree of freedom, though in practice this may be normally redundant with roll rotation about the optical axis of the laser system housing. Accordingly, there may be still only six degrees of freedom of a beam itself, which may truly only exhibit five if the beam may be circularly symmetric. Thus, the two other rotational degrees of freedom may be additive to one another, that may be the pitch and yaw axes of the laser adds to the pitch and yaw induced by aiming the laser housing center toward a given portion of the scene being illuminated.

In one or more of the various embodiments, scanning of a laser system may be accomplished in a variety of manners depending on the arrangement or application of the scanning system. The beam may be scanned by a pair of mirrors moving substantially orthogonal to each other to direct the beam. Scanning mirrors might be galvos, or alternatively could be MEMS mirrors, which might operate in a free-scanning mode or in a resonant scanning mode. The beam might be scanned across the scene by a pair of rotating mirrors, polygonal or other shape. Possibly the system could employ both methods, as shown in FIG. 8B. Other scanning methods could be used, but to check trajectory matching, it will be important to have some knowledge about the beam rotation parameters over time.

In some embodiments, one or more of these parameters may be measured directly. If the beam coming out of a laser scanner may be partially split and directed into a position sensor (such as a position sensitive device, or PSD), then the position at a given instant may be measured. If the PSD has a fast enough readout somewhere near the resolution of the cameras, then measurements over time may be taken as the beam traces trajectories over an object. The X,Y readouts of the PSD may be mapped to the point $P_L$ in the laser projection plane when one knows the relationship between the PSD readouts that correspond to the output angle of the laser and known optical axis of the laser system. However, in an embodiment, the mapping to the point $P_L$ may be done even without exact knowledge of the laser optical axis rotation parameters. Because the optic center of the laser may be known with respect to the cameras' optic centers, then as mentioned previously, the optical axis may be chosen arbitrarily. Then the calibration of the PSD or equivalent may be done relatively simply. By taking several scans spanning the laser's complete or partial range, the two or more cameras can establish the world coordinates of each point in the scan while measuring their timestamp. Associating the timestamp of the world coordinates with the timestamp of the measure PSD position in the laser can allow measuring the true angular scan angle to a very good level of accuracy quickly, with increasing levels accuracy by averaging the scene longer. In this way, the aiming of the pitch and yaw of the laser housing may be separated from the beam steering portions of the laser scanner.

In some embodiments, angles calculated from the beam position measurement may be used as a secondary source of triangulation for determining the position in world coordinates of point P. In many cases, the cameras 1201 and 1205 have much better resolution both spatially and in time than the PSD, and so positioning data of object points from beam data and one camera may not be as accurate. Nevertheless, in some embodiments, the PSD data may still be useful. For instance, if all but one camera may be occluded from the beam spot, then the laser spot position could still be used to continue the trajectories measured and obtain at least a rough position of the object until the beam comes back into view of at least one more camera. In addition, for matching trajectories in multiple beam scanning systems, this data may be more than sufficient. Matching may be done essentially using process 1000, with a few differences owing to the nature of the data. For instance, if multiple beams are scanned across the scene in step 1030, events do not need to be captured on the object, instead the beam position at the scanner may be measured along with the position's timestamp as the beam traverses its path. The trajectory of the beam may then be compared to each event trajectory from each of the cameras to determine matches. Individual positions and timestamps of an arbitrary number of captured positions in the PSD can then be compared directly to points sampled at that timestamp from trajectories fit to curves in step 1060 from the cameras. The residuals from each point from the PSD and the corresponding camera points may be summed in a similar manner to that before to calculate an overall residual score. In another embodiment, the PSD points are not directly compared to the camera event curve; instead, the trajectory of the PSD spot can also be parametrically fit over space and time to generate a fit curve. Then an arbitrary number of points may be sampled over the PSD curve as well as the event camera curve trajectory to calculate a residual score. Even if the average residual due to noise or other inaccuracies may be higher than those calculated using data from cameras alone, nevertheless they should be able to distinguish relative matches, especially where camera data may be missing or else data from matching the laser beam itself could break ties when comparing two trajectories.

In some embodiments, this method may be employed if a laser scanner may be outputting multiple beams, such as in FIG. 8B. In that example, multiple beams are steered using a mirror aiming into a rotating polygonal mirror. Although three beams are shown here, two, four or more are possible. In various embodiments, the individual beams may be split off the same laser beam using beam splitters, diffractive elements, or other means, or else possibly the three beams, beam 835a, beam 835b, and beam 835c are created by different lasers within the assembly. The optical centers of the three beams might each be in a slightly different location, but they could also be aimed such that the optical center lies on the same point in space. The optical center could be where the beams are split, or alternatively, it could be located on or near the first steering mirror 832 or another location within the laser. To measure this, one could split off all of the beams into a PSD that can measure multiple beams simultaneously, but it may be simpler to only split off a single beam from the set. Because each beam has a known geometric angle from the optical center and optic axis of the laser system with respect to each other, measuring the position of any one of the beams with a PSD may be sufficient to characterize the position of all of them. In a variant, rather than measure the beam itself, it may be sufficient to measure the position of the scanning elements themselves. For instance, a scanning mirror may have some direct feedback reporting out its current location; this may be used as a proxy for the beam's angular parameters. In one example, some galvos have optically-encoded readouts that report the mirror's current position. In other configurations, a polygonal spinning mirror might also have an optical encoder for measuring the rotating mirror position or even the beam position coming out of the device. Other scanning devices may have similar arrangements that directly record the scanning element or elements.

In some systems, it may be difficult to directly measure the rotational positions of the beams with the desired level of accuracy, or possibly the layout chosen for the scanning lasers may not have room for direct measurement apparatus. Accordingly, in another embodiment, the rotational position of each laser beam may be estimated or calculated based on information used to drive the laser positions along with data obtained from the various cameras. In this embodiment, the translational position of the optic center of the laser system may be well-calibrated or measured precisely. Since the rotation of the laser axis may be somewhat arbitrary, the rotation matrix portion of the essential matrix may be chosen to simplify the calculations. In one embodiment, the optic axis of the laser may be chosen similarly as before, from the optical center toward the center of the scanning range of the laser, and the rotation around the optical axis may be selected for convenience. In another embodiment, the rotation portion of the essential matrix may be chosen to match that of the camera optical axis for which the essential matrix may be being calculated. For example, if we are calculating $E_{LC1}$ in FIG. 12B in this manner, then the optical axis 1266 would then be set parallel to camera optical axis 1262, with the same rotation parameter around the optical axis (i.e. the rotation matrix would be the identity matrix). Other reasonable choices for rotation matrix of the laser are possible as well. In an embodiment, if all cameras are calibrated with respect to camera 1201, then it may be useful to use the rotational axis (and thus its rotation matrix) of camera 1201 for all of the lasers in the system when calculating the essential matrix between the laser and any of the other cameras. Though there may be substantial freedom in choosing these parameters, they are not completely arbitrary. The direction of the optical axis of the laser must be chosen so that the laser beam physically passes through the projection plane and onto the scene so that the cameras can image the beams as they intersect objects in the scene. In practice, there are more constraints; in the projective space where epipolar constraints are usually calculated, there will be a singularity if the range of the scanned beam has an extent at 90 degrees from the chosen optical axis, so the angle may be offset as long as it may be consistent.

In one or more of the various embodiments, if this frame of reference has been chosen, then the scanning elements of the laser may be calibrated. Briefly, in some embodiments, the process involves measuring the position of a beam spot as it scans across the surface and correlating the position with time information of the scanning control electronics. Each laser scanner may be calibrated individually. This calibration process 1300 is illustrated in FIG. 13A.

Figure 13:
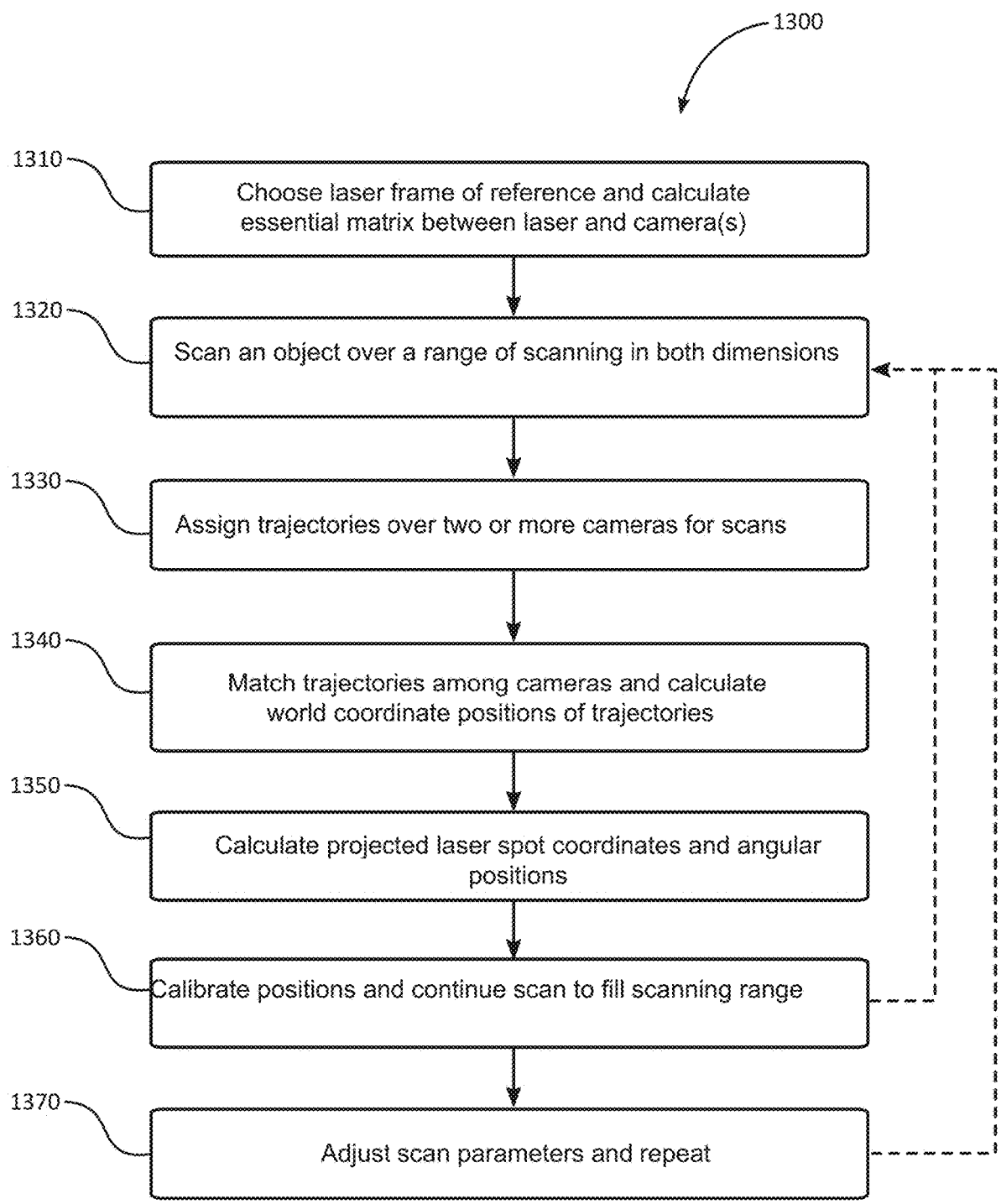
FIG. 13 illustrates a flowchart of a process for calibrating signal sources using multiple beams scanning across a scene in accordance with one or more of the various embodiments.

FIG. 13 illustrates a flowchart of for process 1300 for calibrating signal sources using multiple beams scanning across a scene in accordance with one or more of the various embodiments.

In step 1310, in one or more of the various embodiments, a laser frame of reference may be chosen according to the criteria described in the preceding paragraph, and then the essential matrix may be calculated based on the translation and rotation of the laser's optical axis compared to the camera.

In step 1320, in one or more of the various embodiments, the laser may be scanned over one or more objects including a background such that the entire range of the laser scanner may be visible on the scene. In some configurations, the cameras may have a smaller field of view than the laser range extents, so in a separate embodiment, it may be sufficient to image a portion of the scanning range. The object scanned may have significant depth or could be a flat object. If more than one element may be used to scan the beam, the scanning process could include movement of both elements to fully cover the scene, but in a separate embodiment, the elements could be actuated independently and sequentially (e.g., calibrate one moving mirror with the other turned to a neutral position, then switch to the next). An arbitrary scan pattern may be used for this purpose, though it may be helpful to choose patterns that are similar to those that may be used for 3-D capture of the scene later. In one embodiment, all scanning lasers in the system may be calibrated at the same time. Because matching trajectories using the cameras alone may be robust, accurate positions could be matched over time to uniquely identify each laser by position by relative movement of the scanning portions. In another embodiment, each laser could be scanned individually with others turned off sequentially. In systems where each laser system has more than one beam, each individual beam could be calibrated on their own. In cases where multiple beams are created by splitting a single beam, nevertheless the multiple beam portions may still be uniquely identified by their constant angular dependence and orientation with respect to one another.

In step 1330, in some embodiments, one or more trajectories are captured to two or more of the cameras in the system using methods described elsewhere. In step 1340, these may then be matched among the cameras using methods such as process 1000, and then world coordinate positions may be parametrically fit to each trajectory. Each trajectory thus has both a known space and time position at every spot along the curve. Because the position of the optical center of the laser scanner may be also known, in step 1350, each position's homogenous coordinate may be simply derived in the laser's frame of reference.

In step 1360, in one or more of the various embodiments, the angular position of the beam may be correlated with the expected position of the beam. Note that this part of the process may vary considerably depending on the nature of the scanning elements in the system. For example, if a scanner may be composed of two galvos, the scanner could calibrate at each pointing direction in both axes individually. However this may be disadvantageous, since there may often a large settling time (on the order of hundreds of microseconds) to move and hold the mirror at a given position. Moreover, as stated previously, it may often be desirable to scan the system in a similar manner in which it would be used to scan objects. A smooth movement of each element may achieve this goal and may lead to more accurate calibration later. A galvo's position may be conventionally set by using a control voltage or other signals. Even though the galvo may not report its position, the control signal itself may be used as a proxy for position. However, there may be some of time lag between the signal sent and the mirrors reaching that position. In some embodiments, this may be accounted for by scanning the whole system in many directions. In one example, the two galvos might be set at different speeds, possibly scanning with sinusoidal or other smooth curves; this would lead to an open or closed Lissajous pattern on the scanned object. Because the trajectories may be arbitrarily sampled as many times as needed, accuracy of both spatial and time matching may be quite close. If instead one or more mirrors are MEMS mirrors, similar processes apply as for galvo mirrors, particularly if the mirror or mirrors have two independently controlled axes overall. The process may be somewhat different if at least one of the MEMS mirrors has a resonant driver structure. In this variant, the resonant axis may actuate at a fixed speed, though the amplitude may be controllable. In that axis, the measurement of the position of the beams may be correlated over time to pinpoint the true resonant speed of the mirror; if this has been done, then the amplitude and position in the cycle over time are fit to the true beam position data.

In some embodiments, a similar step may be taken if one or more of the beam steering actuators may be rotating polygonal mirrors. Even in the case where a mirror does not report its exact speed, the system may be normally locked into a certain speed and may be controlled using active feedback systems to maintain a constant rate of rotation. In some embodiments, if the mirror rotates across the scene, the timing and speed of the spot as measured from camera trajectory data may be determined directly the revolutions-per-minute (RPM) rate as well as the duty cycle of the beam. However, in some embodiments, the repetition rate may not directly tell the phase of the rotating element, but still over the course of the scan, the relative position may be measured in time.

Accordingly, in some embodiments, if the complete scan over the range of the rotating mirror may be seen by more than one camera, then the time parameters of the beam as it enters the scene as well as the time it leaves by hitting the edge of a rotating mirror portion to end that part of its duty cycle may be pinpointed. At this point the phase may be calculated directly, and thus the angle of the beam from that element over time may be calculated as well. Even if the endpoints may be not visible if imaging only a portion of the range or may be otherwise uncertain, even a portion of the scanned beam may be fit to the time to minimize epipolar residuals over the course of the scan. If the system may be in use for 3-D measurements, there may need to be a quick check to match the phase with the beam before starting measurements for the first time. This phase may be matched to determine if the laser may be actively visible by a camera or cameras as part of a scan.

Although only a few types of scanning architectures may be presented here in detail, other scanning solutions that have a known control scheme but do not directly report out the mirror or beam positions can similarly be fit and calibrated using these procedures. Care should be taken at high scan angles near the extent of the beam scanner. If a scanner may be being scanned fairly smoothly over the scene, often this means that through much of a single scan the angular velocity of the beam coming out of the laser might be roughly constant through substantial portions of the scene depending on the scan parameters. This may be generally not true in projective space where the epipolar constraints may be calculated where the projective position may appear to change non-linearly, but this may be calibrated throughout the scanning range since the world points sampled from functional curves as reported by the cameras have very accurate timestamps and spatial positions. Linear ranges may be useful, but they may be not necessary for accurate calibration.

In step 1370, in one or more of the various embodiments, if necessary, scan parameters may be adjusted and the process repeated from step 1320 again. This might be needed to change the scanning speed or directions substantially from what was characterized in the earlier steps. For example, if there may be significant anisotropies in how the direction of the scanning beam affects the actual position of the beam, then the scanning pattern itself may be changed for the next iteration. A systematic search of a range of scanning patterns and directions may span the space of possible movements sufficiently so that the position and time may be estimated well under most conditions used for 3-D capture at high accuracy. In the end, a mapping will be provided that correlates the control signals (or other knowledge of control parameters) with laser angular position over time. In some embodiments, the angular mapping may be accurate enough to act as a secondary source of data for triangulation using the beam position and just one other camera. In some other embodiments, the mapping data might not have enough precision or repeatability for accurate beam positioning, but nevertheless remains well within an error tolerance to identify which beam caused a particular trajectory on a camera.

In one or more of the various embodiments, a laser system that reports the position of its scanning optics or beam position could nevertheless be subject to a number of inaccuracies. Such a system could be improved by further calibration using the methods of process 1300. For instance, laser 831 in FIG. 8B is illustrated as having two scanning elements, scanning mirror 832 and rotating polygonal mirror 834. Either or both of these elements may report out their current position, and from these the light direction may be calculated. However, in some cases, the position reported may not match what may be measured by the cameras. If there may be a repeatable spatial inaccuracy, then by matching the calculated trajectory of the beam's angle with the measured beam's angle this may be corrected if it may be a systematic error. More likely may be timing errors or lag in the beam's position from what may be reported. If there may be a consistent time lag between the reported position of the beam and its actual position, this time lag may be measured and the actual position calculated using step 1340 and step 1350 of process 1300. In some cases, the time lag may not be identical; for example, if there may be two separate methods of actuation for spanning different axes in the scan, then the separate methods might each have their own lag; by carefully calibrating each actuation method, even combined lags may be accounted for and the proper beam position be measured from laser system reports when matching trajectories later.

As described before, in some embodiments, generally the essential matrix may be calculated and set for a laser/camera pair, while the coordinates of the imaged beam spots and projected beam spots may be matched. In another embodiment, the essential matrix could be the changing variable. For instance, if each camera frame may be fixed, we could allow the laser frame to follow the laser. In this case, the beam might be assigned to the optical axis of the laser wherever it may be pointing or else always have the same relationship to the optical axis. This should lead to the same result as before, but instead the movement of the essential matrix's rotation matrix would be calibrated to the actual position of the beam.

In general, portions of process 1300 may be used as spot checks during using of the system for 3-D scene capture. If the epipolar matching residuals between the beams and trajectories captured by the cameras skews higher over time, this may be a sign that either or both of the spatial or time correlation of the beam's actual position with its expected position should be recalibrated. Spot recalibrations may not need to be done over the entire span of the laser scanning range, and thus could be quickly done using whatever 3-D data in the scene the system may be currently scanning. Certain types of actuators, such as a resonant MEMS mirror or a spinning polygonal mirror may need timing calibration more often to ensure that any drift in timing of movement may be accounted for. Quick fixes to the time would not require an entire calibration cycle; instead a small number of points may be checked for epipolar matching residuals, and using a small phase time correction this may be quickly fit to minimize the epipolar constraints at those points. In an embodiment, the time drift of the epipolar matching residuals may be tracked and quantified; with a sufficiently long enough time window where the mapping stays true, other calibrations or measurements may be done within this time window with confidence.

In some other systems, precise measurement of the translational position of the optical center of a laser scanner may be difficult or impossible. In other systems, the laser scanner or scanners may not be fixed relative to the cameras at all times. In a further embodiment, epipolar matching may still be accomplished by estimating and iterating on position along with rotation of the beam to locate the laser optical center. In some embodiments, the rotational position of each beam may be measurable by a PSD or similar apparatus, but in other embodiments, the rotational position may need to be calibrated using a method similar to process 1300. In either case, ascertaining the position of the origin of a laser scanning in a system such as system 1200 may be challenging. Cameras such as event cameras that report out a timestamp with each pixel detected have a number of advantages for 3-D scanning, not least of which may be the ability to associate events into trajectories that can be easily matched, which improves ability to both calibrate the cameras as well as obtain quick and accurate 3-D trajectory world positions. The pose of the cameras themselves may be calibrated well using beams that may be visible from all the cameras without knowledge of the position of the beams scanning over objects in the scene. Once, the position and rotation of the cameras may be well characterized, then the world positions of objects being scanned may be observed and calculated by a number of beams quickly.

However, in some cases, the position of the laser may not be immediately apparent even by measuring the position of the reflections of the laser beam off surfaces. In the embodiment where the exact position of the optical center of the laser may be known, then the positions and angles of various elements may be found by simple ray tracing. But this method cannot be used when the laser optical center position may not be known. Most surfaces that the laser scans across may reflect light with a combination of specular reflection and a Lambertian distribution, with the latter often predominating. Though there may be some more light reflecting in the direction of the specular reflection, in general light may be seen on the laser spot on most objects in a wide angular range; if this were not true, then the two or more cameras in a system such as system 1200 would not see the beam through most of its range. In practice, each light spot may be imaged well at each camera under many circumstances. But the position of the laser beam creating the spot cannot easily be measured by only examining the spot's position due to this increase in etendue at the surface. In particular, if multiple static points were measured at the same time from different sources, it may be difficult to ascertain which laser was creating each spot.

More information about laser position may be obtained when using scanning systems such as the ones described herein, particularly when scanning at various depths from the system. FIG. 12C shows a side view of a portion of system 1200, showing only two of the cameras and one of the laser systems similar to FIG. 12B. In this example, a flat object 810 may be placed at position 110a. The object may be flat or could have significant depth. Errors in laser position may show up in a scan of the object at a single location, but these may be difficult to quantify. These errors will be magnified if also scanning at multiple locations, in this example 810b and 810c. Here the laser may be shown scanning an arbitrary pattern 1270.

Figure 14:
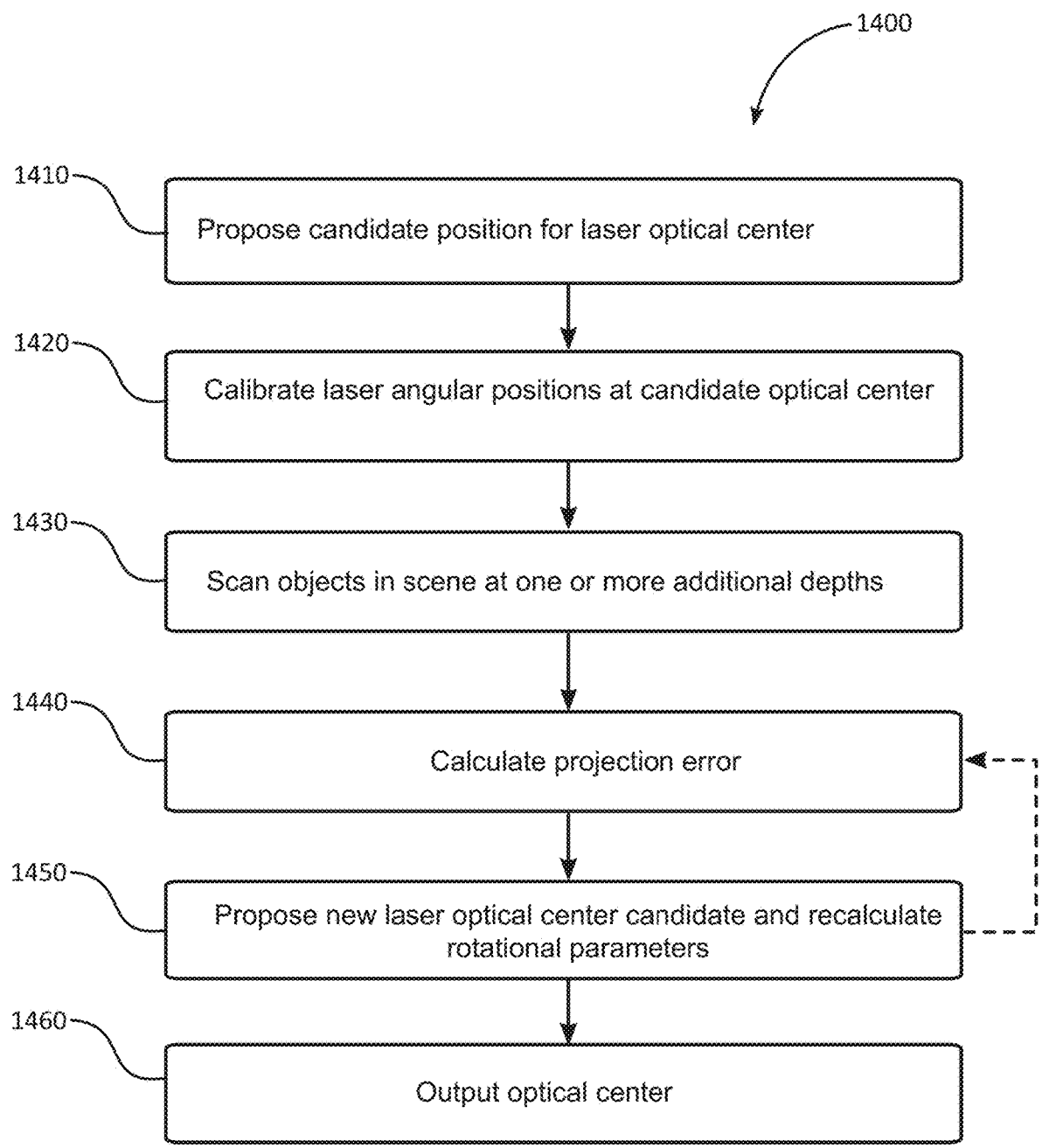
FIG. 14 illustrates a flowchart of a process for calibrating laser sources using multiple beams scanning across a scene in accordance with one or more of the various embodiments.

FIG. 14 illustrates a flowchart of process 1400 for calibrating laser sources using multiple beams scanning across a scene in accordance with one or more of the various embodiments.

In some embodiments, process 1400 may be applied to each laser sequentially, though in a separate embodiment, all lasers may have their positions calibrated substantially simultaneously.

In step 1410, in one or more of the various embodiments, a candidate position for the laser optical center is proposed. In some embodiments, the camera/laser system may be physically measured or otherwise examined, and a rough estimation of the optical center may be made. Initial errors in the measurements will be smaller if the candidate optical center may be close to the actual optical center, but this is not necessary for the calibration process, as the starting position may be somewhat arbitrary. In an embodiment, the candidate position may be placed at one of the optical centers of one of the cameras.

FIG. 12D may be a top down view the system as depicted in FIG. 12C. Here the Z-axis may be shown as depth facing toward position 810a, position 810b, and position 810c though world coordinates may be arbitrary, and could otherwise be linked to one of the cameras as a reference instead. The optical centers of the two cameras and the laser being calibrated are points $O_{C1}$, $O_{C2}$, and $O_L$ respectively, though at this point the position of $O_L$ may be unknown. The candidate optical center may be $O_{LCan}$; the relative position of the two points $O_{LCan}$ and $O_L$ may be shown non-coincident in the X- and Z-axes, but may be different in any or all of the three axes of the system.

In step 1420, in one or more of the various embodiments, the laser rotational parameters may be calibrated with respect to the candidate optical center. Similar to before, an arbitrary optical axis may be chosen for the candidate optical center, though it may be convenient to choose an optical axis again that may be parallel to one of the camera optical axes. In the embodiment where there may be no direct readout of relative angles being produced by the laser system, then a calibration method such as process 1300 may be used. Nearly the same steps are taken to characterize the beam as before but step 1350 and step 1360 may be slightly different. The projected laser spot coordinates and angular positions may be calculated and calibrated relative to the candidate optical center of the laser beam rather than the actual optical center. As such, if the candidate optical center did not happen to be chosen exactly at the correct point, then the calibrated angles may be incorrect but they may be consistent to the world points measured by the cameras. This is illustrated in FIG. 12D, where three of the points in the scan, $P_A$, $P_B$, and $P_C$ are shown as portions of a scan of an object at position 810a. Solid lines show the angular relationship between the points $P_A$, $P_B$, and $P_C$ and the optical center $O_{LCan}$. Dotted lines show a similar relationship between the points and the candidate optical center $O_{LCan}$. Although we'll examine these points as discrete for illustrative purposes, they may be actually part of continuous scans over the entire scene and will generally be captured as trajectories.

In this example, for some embodiments, the points lie upon the surface of flat object 810, and for calibrating rotational parameters where there are many unknowns, the scene may be static currently, though in an embodiment, these parameters could also be extracted from a dynamic scene where objects are moving. As part of process 1300, entire scans in many directions can be taken to characterize the angular response relative to driving signals of the laser system as compared to world coordinates at each instantaneous spot during the scan. In general, the scan taken during this step may be more accurate if done with a relatively static scene, at least of the time scale of the scan. For instance, if the entire calibration scan can characterize the beam position well in 20 ms, then a moving scene might still appear static enough on that time scale to work for this process.

In one or more of the various embodiments, the result of step 1420 may be an angular mapping between points scanned and the position of the laser at each point with respect to $O_{LCan}$ and the two camera optical centers. In some embodiments where the laser system does provide some information about the relative laser angles in time, then the angular mapping similar to before can be accomplished with a few scans across the scene to establish the correlation of the relative angles scanned with the actual world points. Here the angular mapping may be still with respect to $O_{LCan}$. The angular mapping may be represented as angles over time with respect to the optical axis at $O_{LCan}$, but alternately could be represented as a projection in homogeneous coordinate space for the virtual camera instead. Some information can be inferred directly from the angular mapping. If a scan were relatively smooth, there may be many portions of a particular scan with relatively constant angular velocity. In these cases, the angular mapping of that trajectory may stay at the same velocity through this portion of the scan, but if there may be significant disparity between the actual laser optical center and the candidate laser optical center, then the angular velocity will appear to change over that trajectory. Although it may be possible to infer from many measurements in different directions some information about where the optical center truly may be, in practice this may be difficult because the angular changes may be relatively small, especially at longer distances. Also, there may be rarely truly constant velocity of the laser, and complicated scanning patterns may confound a simple analysis. In practice, for some embodiments, it may be often simpler to temporarily treat the angular measurements from $O_{LCan}$ as true, as this also allows nonlinear velocities and patterns to be used as well, though in an embodiment aspects of the laser optical center can be calculated or at least approximated additionally at the end of this step as well.

In step 1430, in one or more of the various embodiments, the scene may be scanned at one or more additional depths. In an example, FIG. 12D shows scanning by moving object 810 to position 810b and position 810c. Patterns and points scanned do not necessarily correspond to points or trajectories captured in the calibration scan while the object was as position 810a. However the scans of points at various depths should at least in part be taken at different distances from the laser optical center for any given scan angle than the first calibration scan in step 1420. The angular mapping produced from step 1420 may be reasonably exact over the range with respect to $O_{LCan}$. But at different depths, parallax error may be introduced into the measurement. In the example, when the actual laser was scanning through point $P_A$ this may be measured with a world coordinate relative to the cameras in space regardless of where the laser optical center may be at that moment in time. The actual laser scanned through this same point $P_A$ while the virtual laser associated with optical center $O_{LCan}$ also sent out a virtual beam through the same point $P_A$. Because the calibration of step 1420 was done with respect to $O_{LCan}$, there may be a one-to-one mapping with the actual point in space and the "incorrect" mapping angle calibration. When looking at an object at a different depth, then the correspondence is broken. For instance, if the same object may be moved back to position 810b, then at the same angle calibrated from $O_{LCan}$ should be measured at point $P'_A$, but instead, it may be seen at $P''A$. Errors along the Y-axis cannot be seen in this figure, so the actual angular error may be worse than depicted. If $O_{LCan}$ was chosen to exactly match up with $O_L$, then these errors would disappear at all measured depths. In some embodiments, step 1430 may include measuring one or more objects at various discrete distances from the laser, but the additional scans could be done in a continuous manner; the system might calibrate at one depth and then continue scanning while moving the object or objects further or closer.

In step 1440, in one or more of the various embodiments, the residual projection error over the scene may be calculated. This may be done in a number of ways. In one embodiment, the residual error can use the angular mismatch at various depths in the scene may be summed or averaged, either by summing the absolute value of the angular errors, the sum of squares of angular errors, or some other suitable method. Angular mismatch may be calculated as follows. In our previous example, when a flat surface positioned at location 810b was scanned, the point $P''A$ was measured while the angular mapping at that time would have suggested point $P'_A$ should have been measured if there was no error in choosing the candidate optical center. The angular error for that point would be the difference in angle between the line segments $O_{LCan}$-$P'_A$ and $O_{LCan}$-$P''A$. This may be repeated for each point measured at each additional depth. Note that though our example used a flat object in different positions, this may not be required. For instance, an object scanned that has a different three-dimensional shape might have an actual measured point that lies at $P'''_A$ but not one that lies on $P'_A$. This does not affect the calculation, since no actual beam intersects the object at $P'_A$, but instead the virtual beam may be traced in that direction. Thus, in some embodiments, the residual angle may be unaffected for the calculation, since it may be the mapped virtual beam angle that may be used to project the angle. In another embodiment, the errors may be represented in the homogeneous coordinate plane of the virtual laser instead. This may be just another representation of similar data, so should lead to the same magnitude of residual error. In this case, the mapping from the angular coordinates of the laser over time at each point of the scan are first mapped onto homogenous coordinates of the virtual camera with optical center $O_{LCan}$. Then this may be compared to the actual point measured in world space in homogenous coordinate space of the same virtual camera. The difference between the two points would be the residual error for that point, which may be summed or averaged in similar ways to the angular error. The projective homogeneous coordinate could alternatively be compared to the view from any of the two, three, or more cameras in the system. For this one might use the epipolar matching residual, where the essential matrix may be calculated based on the virtual camera centered at $O_{LCan}$ as compared to each camera. For the points measured at additional depths, in this embodiment the world points could be calculated using data from various cameras, or in a variant, the imaged points in the homogeneous coordinate system of each camera could be directly compared to the homogenous angular coordinate map. Epipolar matching residuals may be calculated similarly as described above. Though the net error may be summed or averaged to produce a single error value to be minimized later, in an embodiment the various errors at different scan points may be kept for a later calculation step.

In step 1450, in one or more of the various embodiments, the net error may be checked to determine if the correct optical center of the laser has been found. If the residual error across the scene may be lower than an arbitrary tolerance value, then the process can end, and the result reported out in step 1460. However, in some embodiments, if there may be still substantial error, a new optical center candidate $O_{LCan2}$ may be proposed, and the process started again. In one embodiment, a simple search may be done to compare positions and residual errors at the new position. At the new point $O_{LCan2}$, parts of process 1400 may be repeated. However, it may be not necessary to repeat either of the scanning step 1420 or step 1430. In an embodiment where the angular mapping was calibrated to control signals, this calibration map may be directly used. The angular map was based at each portion of the scan on the angular position with respect to point $O_{LCan}$. The same angular map may be used but instead projectively mapped to the new optical center candidate $O_{LCan2}$. Then new angles may be calculated from the scanned points at additional depths based $O_{LCan2n}$ as well. In some embodiments where the homogeneous coordinate space may be used for the angular mapping, the additional scan points may not have to be remapped as one can directly use the homogeneous camera coordinates to calculate epipolar residuals with the new angular mapping in the laser candidate homogeneous coordinate space. In each case, the new projection errors may be calculated according to the same metric as used before, and a new residual error may be calculated.

In some embodiments, the simple search might consist of trying a plurality of new optical center candidates in different directions from the first and continuing to move in the direction of lowering residual error. In an embodiment, the errors across the scans of the scene are kept as they are useful data; they may form a conic section that may be projected back to calculate the position of the true optical center of the laser directly. However noisy data may make this difficult, so in other embodiments, error data in aggregate may be used as input to a process such as bundle adjustment to iterate to find the true optical center. In this case, the overall metric to be minimized may still be one as described beforehand, but additional data of angular or other projection errors can help the position converge much more quickly.

In some embodiments, the scene need not be extremely static, such that portions of step 1420 and 1430 could be combined. In one example, in FIG. 12C, if a flat object that contains a significant portion of the laser scan range may be placed at location 810c, then this surface could be used to calibrate the angular mapping of step 1420. If at the same time or shortly thereafter, a person (or other object) moves across the scene in front of the object at 810c, the person would be measured at a different depths than the first object in the background across the scene. This disparity would be sufficient to create enough angular error measurements to calculate the laser position, and may have certain other advantages. Though the person obstructs the view of the back object at certain times, when the back object becomes visible again, the angular mapping may be rechecked at this object to insure that it was accurate during measurement of the person. Other configurations may be possible as well. In some embodiments, the scene could be considerably more dynamic during the calibration process 1400, including multiple objects at various depths that may be substantially flat or have substantial 3-D structure. As long as the laser can adequately map enough at enough points and angles over a large enough range of its scanning range to minimize error, and also measure objects at various depths at similar scan angles, this process may be used to calculate the laser center, and then repeated for other lasers in the system. In some embodiments where a single laser scanner outputs and scans multiple beams, this process can calibrate all of them at the same time; in this case, matching of the various beams would be done at the multiple cameras level before being matched to the laser beams themselves. Single or multiple laser optical centers could be proposed depending on the geometry of the scanner.

Once the position of each laser scanner has been ascertained, other processes and applications as mentioned herein can then be employed, such as further calibrating rotational dynamics over time as in process 1300, or otherwise epipolar matching of beams during 3-D point capture.

It will be understood that each block (or step) in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block (or step) in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Further, in some cases, for brevity or clarity, signal generators are referred to above as lasers, scanning lasers, or the like. Accordingly, one of ordinary skill in the art will appreciate that such specific references may be considered to be signal generators. Likewise, in some cases, sensors, event sensors, image sensors, or the like, may be referred to as cameras, event cameras, image cameras, frame capture cameras, or the like. Accordingly, one of ordinary skill in the art will appreciate that such specific references may be considered to be sensors, event sensors, image sensors, or the like.

What is claimed as new and desired to be protected by Letters Patent of the United States is:

1. A method for sensing objects using one or more processors that are configured to execute instructions, wherein the instructions perform actions, comprising:
   providing a sensing system that employs two or more signal beams to scan a plurality of paths across an object, wherein two or more sensors separately detect signals from the two or more signal beams reflected by the object;
   determining a plurality of events based on the separately detected signals, wherein the plurality of events include one or more pairs of events that correspond to one or more pairs of sensors;
   generating one or more essential matrices based on one or more position characteristics of the two or more sensors, wherein each essential matrix corresponds to each pair of sensors;
   comparing the one or more pairs of events associated with the one or more pairs of sensors based on each essential matrix that corresponds to each pair of sensors;
   providing one or more error scores for the one or more pairs of events based on the comparison; and
   in response to an error score for a pair of events being less than a threshold value, associating each event in the pair of events with a same point location on the scanned object, wherein triangulation of the point location is employed to determine at least a three-dimensional position of the object.

2. The method of claim 1, wherein comparing the one or more pairs of events associated with the one or more pairs of sensors, further comprises, substituting a fundamental matrix that corresponds to each pair of sensors for the essential matrix.

3. The method of claim 1, wherein determining the plurality of events based on the separately detected signals, further comprises:
   providing a time window based on one or more of one or more characteristics of the sensing system or one or more characteristics of the object;
   detecting one or more signals that occur within the time window; and
   determining the plurality of events based on the one or more detected signals.

4. The method of claim 1, further comprising:
   generating one or more parametric trajectories based on the plurality of events; and
   determining the one or more pairs of events based on the one or more parametric trajectories, wherein each event corresponds to a point on a parametric trajectory.

5. The method of claim 1, wherein determining the plurality of events based on the separately detected signals further comprises:

generating a plurality of parametric trajectories based on the detected signals;
associating each parametric trajectory with a separate sensor based on which sensor is associated with the detected signals that correspond to each parametric trajectory;
determining one or more points from each parametric trajectory based on the curve segment that fits the parametric trajectory; and
generating one or more events based on the one or more points.

6. The method of claim 1, wherein the sensing system further comprises:
generating the two or more signal beams based on two or more lasers that are included in the sensing system.

7. The method of claim 1, wherein the two or more sensors include one or more of an event sensor or an image sensor.

8. The method of claim 1, wherein determining the plurality of events based on the separately detected signals, further comprises:
determining a position on a sensor that detects the separately detected signal; and
determining a time that corresponds to the time the sensor detects the separately detected signal.

9. A system for sensing objects:
a network computer, comprising:
a memory that stores at least instructions; and
one or more processors configured to execute instructions, wherein the instructions perform actions, including:
providing a sensing system that employs two or more signal beams to scan a plurality of paths across an object, wherein two or more sensors separately detect signals from the two or more signal beams reflected by the object;
determining a plurality of events based on the separately detected signals, wherein the plurality of events include one or more pairs of events that correspond to one or more pairs of sensors;
generating one or more essential matrices based on one or more position characteristics of the two or more sensors, wherein each essential matrix corresponds to each pair of sensors;
comparing the one or more pairs of events associated with the one or more pairs of sensors based on each essential matrix that corresponds to each pair of sensors;
providing one or more error scores for the one or more pairs of events based on the comparison; and
in response to an error score for a pair of events being less than a threshold value, associating each event in the pair of events with a same point location on the scanned object, wherein triangulation of the point location is employed to determine at least a three-dimensional position of the object; and
one or more client computers, comprising:
a memory that stores at least instructions; and
one or more processors configured to execute instructions, wherein the instructions perform actions, including, providing one or more portions of the plurality of events.

10. The system of claim 9, wherein comparing the one or more pairs of events associated with the one or more pairs of sensors, further comprises, substituting a fundamental matrix that corresponds to each pair of sensors for the essential matrix.

11. The system of claim 9, wherein determining the plurality of events based on the separately detected signals, further comprises:
providing a time window based on one or more of one or more characteristics of the sensing system or one or more characteristics of the object;
detecting one or more signals that occur within the time window; and
determining the plurality of events based on the one or more detected signals.

12. The system of claim 9, wherein the one or more processors of the network computer are configured to execute instructions, wherein the instructions perform actions further comprising:
generating one or more parametric trajectories based on the plurality of events; and
determining the one or more pairs of events based on the one or more parametric trajectories, wherein each event corresponds to a point on a parametric trajectory.

13. The system of claim 9, wherein determining the plurality of events based on the separately detected signals further comprises:
generating a plurality of parametric trajectories based on the detected signals;
associating each parametric trajectory with a separate sensor based on which sensor is associated with the detected signals that correspond to each parametric trajectory;
determining one or more points from each parametric trajectory based on the curve segment that fits the parametric trajectory; and
generating one or more events based on the one or more points.

14. The system of claim 9, wherein the sensing system further comprises:
generating the two or more signal beams based on one or more lasers that are included in the sensing system.

15. The system of claim 9, wherein the two or more sensors include one or more of an event sensor or an image sensor.

16. The system of claim 9, wherein determining the plurality of events based on the separately detected signals, further comprises:
determining a position on a sensor that detects the separately detected signal; and
determining a time that corresponds to the time the sensor detects the separately detected signal.

17. A network computer for sensing objects, comprising:
a memory that stores at least instructions; and
one or more processors configured to execute instructions, wherein the instructions perform actions, including:
providing a sensing system that employs two or more signal beams to scan a plurality of paths across an object, wherein two or more sensors separately detect signals from the two or more signal beams reflected by the object;
determining a plurality of events based on the separately detected signals, wherein the plurality of events include one or more pairs of events that correspond to one or more pairs of sensors;
generating one or more essential matrices based on one or more position characteristics of the two or more sensors, wherein each essential matrix corresponds to each pair of sensors;

comparing the one or more pairs of events associated with the one or more pairs of sensors based on each essential matrix that corresponds to each pair of sensors;

providing one or more error scores for the one or more pairs of events based on the comparison; and in response to an error score for a pair of events being less than a threshold value, associating each event in the pair of events with a same point location on the scanned object, wherein triangulation of the point location is employed to determine at least a three-dimensional position of the object.

18. The network computer of claim 17, wherein comparing the one or more pairs of events associated with the one or more pairs of sensors, further comprises, substituting a fundamental matrix that corresponds to each pair of sensors for the essential matrix.

19. The network computer of claim 17, wherein determining the plurality of events based on the separately detected signals, further comprises:
providing a time window based on one or more of one or more characteristics of the sensing system or one or more characteristics of the object;
detecting one or more signals that occur within the time window; and
determining the plurality of events based on the one or more detected signals.

20. The network computer of claim 17, wherein the one or more processors are configured to execute instructions, wherein the instructions perform actions further comprising:
generating one or more parametric trajectories based on the plurality of events; and
determining the one or more pairs of events based on the one or more parametric trajectories, wherein each event corresponds to a point on a parametric trajectory.

21. The network computer of claim 17, wherein determining the plurality of events based on the separately detected signals further comprises:
generating a plurality of parametric trajectories based on the detected signals;
associating each parametric trajectory with a separate sensor based on which sensor is associated with the detected signals that correspond to each parametric trajectory;
determining one or more points from each parametric trajectory based on the curve segment that fits the parametric trajectory; and
generating one or more events based on the one or more points.

22. The network computer of claim 17, wherein the sensing system further comprises:
generating the two or more signal beams based on one or more lasers that are included in the sensing system.

23. The network computer of claim 17, wherein the two or more sensors include one or more of an event sensor or an image sensor.

24. The network computer of claim 17, wherein determining the plurality of events based on the separately detected signals, further comprises:
determining a position on a sensor that detects the separately detected signal; and
determining a time that corresponds to the time the sensor detects the separately detected signal.

25. A processor readable non-transitory storage media that includes instructions for sensing objects, wherein execution of the instructions by one or more processors on one or more network computers performs actions, comprising:

providing a sensing system that employs two or more signal beams to scan a plurality of paths across an object, wherein two or more sensors separately detect signals from the two or more signal beams reflected by the object;

determining a plurality of events based on the separately detected signals, wherein the plurality of events include one or more pairs of events that correspond to one or more pairs of sensors;

generating one or more essential matrices based on one or more position characteristics of the two or more sensors, wherein each essential matrix corresponds to each pair of sensors;

comparing the one or more pairs of events associated with the one or more pairs of sensors based on each essential matrix that corresponds to each pair of sensors;

providing one or more error scores for the one or more pairs of events based on the comparison; and in response to an error score for a pair of events being less than a threshold value, associating each event in the pair of events with a same point location on the scanned object, wherein triangulation of the point location is employed to determine at least a three-dimensional position of the object.

26. The media of claim 25, wherein comparing the one or more pairs of events associated with the one or more pairs of sensors, further comprises, substituting a fundamental matrix that corresponds to each pair of sensors for the essential matrix.

27. The media of claim 25, wherein determining the plurality of events based on the separately detected signals, further comprises:
providing a time window based on one or more of one or more characteristics of the sensing system or one or more characteristics of the object;
detecting one or more signals that occur within the time window; and
determining the plurality of events based on the one or more detected signals.

28. The media of claim 25, further comprising:
generating one or more parametric trajectories based on the plurality of events, wherein each parametric trajectory is a parametric representation of a one-dimensional curve segment in a three-dimensional space; and
determining the one or more pairs of events based on the one or more parametric trajectories, wherein each event corresponds to a point on a parametric trajectory.

29. The media of claim 25, wherein determining the plurality of events based on the separately detected signals further comprises:
generating a plurality of parametric trajectories based on the detected signals, wherein each parametric trajectory is a parametric representation of a one-dimensional curve segment in a three-dimensional space;
associating each parametric trajectory with a separate sensor based on which sensor is associated with the detected signals that correspond to each parametric trajectory;
determining one or more points from each parametric trajectory based on the curve segment that fits the parametric trajectory; and
generating one or more events based on the one or more points.

30. The media of claim 25, wherein the sensing system further comprises:
generating the two or more signal beams based on one or more lasers that are included in the sensing system.

31. The media of claim 25, wherein the two or more sensors include one or more of an event sensor or an image sensor.

32. The media of claim 25, wherein determining the plurality of events based on the separately detected signals, further comprises:
   determining a position on a sensor that detects the separately detected signal; and
   determining a time that corresponds to the time the sensor detects the separately detected signal.

* * * * *